(12) United States Patent
Skillen et al.

(10) Patent No.: US 9,129,019 B2
(45) Date of Patent: Sep. 8, 2015

(54) ASSOCIATIVE SEARCH ENGINE

(71) Applicant: Rockstar Consortium US LP, Plano, TX (US)

(72) Inventors: Richard Prescott Skillen, Mississauga (CA); Frederick Caldwell Livermore, Stittsville (CA)

(73) Assignee: RPX CLEARINGHOUSE LLC, Dover, DE (US)

( * ) Notice: Subject to any disclaimer, the term of this patent is extended or adjusted under 35 U.S.C. 154(b) by 0 days.

(21) Appl. No.: 13/724,032

(22) Filed: Dec. 21, 2012

(65) Prior Publication Data

US 2013/0117250 A1 May 9, 2013

Related U.S. Application Data

(63) Continuation of application No. 13/031,478, filed on Feb. 21, 2011, which is a continuation of application No. 11/767,563, filed on Jun. 25, 2007, now Pat. No. 7,895,183, which is a continuation of application No. 09/351,747, filed on Jul. 8, 1999, now Pat. No. 7,236,969, which is a continuation of application No. 08/798,747, filed on Feb. 13, 1997, now Pat. No. 6,098,065.

(51) Int. Cl.
*G06F 7/04* (2006.01)
*G06F 17/30* (2006.01)
*G06Q 30/02* (2012.01)

(52) U.S. Cl.
CPC .... *G06F 17/30864* (2013.01); *G06F 17/30424* (2013.01); *G06F 17/30867* (2013.01); *G06Q 30/02* (2013.01); *G06Q 30/0241* (2013.01); *G06Q 30/0256* (2013.01); *G06Q 30/0257* (2013.01); *G06F 17/30873* (2013.01); *G06F 17/30876* (2013.01); *Y10S 707/959* (2013.01); *Y10S 707/99933* (2013.01);

(Continued)

(58) Field of Classification Search
CPC ............... G06F 17/30873; G06F 17/30864; G06F 17/30876
See application file for complete search history.

(56) References Cited

U.S. PATENT DOCUMENTS 5,241,671 A 8/1993 Reed et al.
5,265,065 A 11/1993 Turtle
(Continued)

FOREIGN PATENT DOCUMENTS

EP 0749081 A1 12/1996
JP H05143653 A 6/1993
WO 9721183 A1 6/1997

OTHER PUBLICATIONS

"Fuzzy Database Language and Library—Fuzzy Extension to SQL," Nakajima, Hiroshi, Sogoh, Taiji, Arao, Masaki, Second IEEE International Conference on Fuzzy Systems, pp. 477-482, 1993.*

(Continued)

*Primary Examiner* — Bruce Moser
(74) *Attorney, Agent, or Firm* — Withrow & Terranova, P.L.L.C.

(57) ABSTRACT

This invention relates to an advertisement machine which provides advertisements to a user searching for desired information within a data network. The machine receives, from a user, a search request including a search argument corresponding to the desired information and searches, based upon the received search argument, a first database having data network related information to generate search results. It also correlates the received search argument to a particular advertisement in a second database having advertisement related information. The search results together with the particular advertisement are provided by the machine to the user.

10 Claims, 2 Drawing Sheets

(52) U.S. Cl.
CPC .. *Y10S 707/99936* (2013.01); *Y10S 707/99943* (2013.01); *Y10S 707/99945* (2013.01)

(56) References Cited

U.S. PATENT DOCUMENTS

| | | | |
|---|---|---|---|
| 5,283,731 A | | 2/1994 | Lalonde et al. |
| 5,515,098 A | | 5/1996 | Carles |
| 5,589,892 A | | 12/1996 | Knee et al. |
| 5,594,661 A | | 1/1997 | Bruner et al. |
| 5,634,051 A | * | 5/1997 | Thomson ............... 1/1 |
| 5,659,732 A | | 8/1997 | Kirsch |
| 5,682,525 A | | 10/1997 | Bouve et al. |
| 5,694,594 A | | 12/1997 | Chang |
| 5,704,017 A | | 12/1997 | Heckerman et al. |
| 5,710,884 A | | 1/1998 | Dedrick |
| 5,717,923 A | * | 2/1998 | Dedrick ............... 1/1 |
| 5,721,827 A | | 2/1998 | Logan et al. |
| 5,721,903 A | | 2/1998 | Anand et al. |
| 5,724,424 A | | 3/1998 | Gifford |
| 5,724,521 A | | 3/1998 | Dedrick |
| 5,727,129 A | | 3/1998 | Barrett et al. |
| 5,732,216 A | | 3/1998 | Logan et al. |
| 5,740,549 A | * | 4/1998 | Reilly et al. ............... 705/14.42 |
| 5,745,882 A | | 4/1998 | Bixler et al. |
| 5,751,956 A | | 5/1998 | Kirsch |
| 5,754,938 A | | 5/1998 | Herz et al. |
| 5,754,939 A | | 5/1998 | Herz et al. |
| 5,761,662 A | | 6/1998 | Dasan |
| 5,778,362 A | | 7/1998 | Deerwester |
| 5,794,210 A | | 8/1998 | Goldhaber et al. |
| 5,848,396 A | | 12/1998 | Gerace |
| 5,860,068 A | | 1/1999 | Cook |
| 5,864,845 A | | 1/1999 | Voorhees et al. |
| 5,886,683 A | | 3/1999 | Tognazzini et al. |
| 5,901,287 A | | 5/1999 | Bull et al. |
| 5,913,040 A | | 6/1999 | Rakavy et al. |
| 5,920,854 A | | 7/1999 | Kirsch et al. |
| 5,933,811 A | | 8/1999 | Angles et al. |
| 5,948,061 A | | 9/1999 | Merriman et al. |
| 5,974,409 A | | 10/1999 | Sanu et al. |
| 5,987,099 A | | 11/1999 | O'Neill et al. |
| 5,987,446 A | | 11/1999 | Corey et al. |
| 5,995,943 A | | 11/1999 | Bull et al. |
| 5,999,912 A | | 12/1999 | Wodarz et al. |
| 6,014,638 A | | 1/2000 | Burge et al. |
| 6,052,714 A | | 4/2000 | Miike et al. |
| 6,119,101 A | | 9/2000 | Peckover |
| 6,119,135 A | | 9/2000 | Helfman |
| 6,128,663 A | | 10/2000 | Thomas |
| 6,151,600 A | | 11/2000 | Dedrick |
| 6,173,045 B1 | | 1/2001 | Smith |
| 6,183,366 B1 | | 2/2001 | Goldberg et al. |
| 6,199,076 B1 | | 3/2001 | Logan et al. |
| 6,243,375 B1 | | 6/2001 | Speicher |
| 6,253,188 B1 | | 6/2001 | Witek et al. |
| 6,285,987 B1 | | 9/2001 | Roth et al. |
| 6,374,237 B1 | | 4/2002 | Reese |
| 6,385,646 B1 | * | 5/2002 | Brown et al. ............... 709/217 |
| 6,397,228 B1 | | 5/2002 | Lamburt et al. |
| 6,463,431 B1 | | 10/2002 | Schmitt |
| 6,484,161 B1 | | 11/2002 | Chipalkatti et al. |
| 6,496,843 B1 | | 12/2002 | Getchius et al. |
| 6,639,608 B1 | | 10/2003 | Itakura |
| 6,650,998 B1 | | 11/2003 | Rutledge et al. |
| 6,712,702 B2 | | 3/2004 | Goldberg et al. |
| 7,013,478 B1 | | 3/2006 | Hendricks et al. |
| 7,072,849 B1 | | 7/2006 | Filepp et al. |
| 7,136,853 B1 | | 11/2006 | Kohda et al. |
| 7,225,142 B1 | | 5/2007 | Apte et al. |
| 7,236,969 B1 | | 6/2007 | Skillen et al. |
| 7,496,943 B1 | | 2/2009 | Goldberg et al. |
| 7,844,488 B2 | | 11/2010 | Merriman et al. |
| 7,895,183 B2 | | 2/2011 | Skillen et al. |
| 7,945,553 B2 | | 5/2011 | Skillen et al. |
| 2008/0065603 A1 | | 3/2008 | Carlson et al. |
| 2012/0030199 A1 | | 2/2012 | Mohajer |
| 2012/0084151 A1 | | 4/2012 | Kozak et al. |
| 2012/0084349 A1 | | 4/2012 | Lee |

OTHER PUBLICATIONS

Author Unknown, "AdWords Advantages," Google, 2004, adwords.google.com/select/advantages.html, in U.S. Appl. No. 09/351,747, accessed Apr. 3, 2004, 2 pages.

Brin, et al., "The Anatomy of a Large-scale Hypertextual Web Search Engine," Computer Networks and ISDN Systems, 1998, 20 pages.

Chang, et al., "An agent-based Search Engine based on the Internet Search Service on the CORBA," International Symposium on Distributed Objects and Applications, 1999, pp. 26-33.

Deng, "Local Web Advertisement Through Dynamic Active Proxy," International Conference on Multimedia and Expo, Jul. 2000, pp. 1183-1186.

Author Unknown, "Surfin' DPLS!," DPLS News, Data and Program Library Service, University of Wisconsin-Madison, Oct. 1996, dpls.dacc.wisc.edu/pubs/Newsletters/oct96news.html, accessed Nov. 30, 2002, 6 pages.

Author Unknown, "Google," Wikipedia, http://en.wikipedia.org/wiki/Google_Inc., accessed Feb. 20, 2005, 9 pages.

Author Unknown, "Sergey Brin," Wikipedia, http://en.wikipedia.org/wiki/Sergey_Brin, accessed Feb. 20, 2005, 4 pages.

Gallagher, et al., "A Framework for Targeting Banner Advertising on the Internet," 13th Annual Hawaii International Conference on System Sciences, vol. 4, Jan. 7-10, 1997, pp. 265-274.

Gansing, "An Interview with Lev Manovich in Malmo," Malmo, Sweden, Aug. 2002, 9 pages.

Han, et al., "Data Mining for Web Intelligence," Computer, vol. 35, Iss. 11, Nov. 2002, pp. 64-70.

Sullivan, http://searchenginewatch.com/seraport/article.php/2205741, The Search Engine Report, No. 2, Dec. 22, 1996, 4 pages.

Sullivan, http://searchenginewatch.com/seraport/article.php/2205961, The Search Engine Report, No. 1, Jul. 23, 1996, 3 pages.

Sullivan, http://searchenginewatch.com/seraport/article.php/2205971, The Search Engine Report, No. 3, Jan. 31, 1997, 5 pages.

Hanpo et al., "A Comparative Study for Search Engine Business Model—Based on the case of Baidu and Google," International Conference on E-Business and E-Government, May 2010, pp. 228-232.

Handley, "Interview in ClickZ with Glenn Fleischman," The ClickZ Letter, Sep. 18, 1997, Issue 3, 15 pages.

Kohli, et al., "Evolution of Interdependency Model based on Behavioral Analysis of User, Search Engine, and Advertiser in Online Advertising," Fourth International Conference on Innovations in Information Technology, Nov. 2007, pp. 213-217.

Layton, "How Amazon Works," Howstuffworks, 2008, http://money.howstuffworks.com/amazon.htm, accessed Mar. 23, 2008, 5 pages.

Lee, et al., "Hybrid gateway advertisement scheme for connecting mobile ad hoc networks to the Internet," 57th Semiannual Vehicular Technology Conference, Apr. 2003, pp. 191-195.

Lee, et al., "Research on the Advertisement Effect of Push Type Mobile Advertisement," Fourth International Conference on Cooperation and Promotion of Information Resources in Science and Technology, Nov. 2009, pp. 137-142.

Li, et al. "On Detection of Advertising Images," International Conference on Multimedia and Expo, Jul. 2007, pp. 1758-1761.

Mauldin, "Lycos: Design choices in an Internet search service," IEEE Expert, Institute of Electrical and Electronics Engineers, Inc., Jan. 1997, 7 pages.

Marchiori, "The Quest for Correct Information on the Web: Hyper Search Engines," Computer Networks and ISDN Systems, vol. 29, Sep. 1997, pp. 1225-1236.

Winterton, "E-Commerce," Webtrospecticus: A Very Brief History of the Internet, 1996, http://webtrospecticus.com/1996-ecommerce.htm, accessed Mar. 23, 2008, 1 page.

Author Unknown, "Global E-Commerce: North America—Early History," Net Industries, 2008, http://ecommerce.hostip.info/pages/501/Global-E-Commerce-North-America-EARLY-HISTORY.html, accessed Mar. 23, 2008, 5 pages.

(56) References Cited

OTHER PUBLICATIONS

Ng et al., "An Intelligent Agent for Web Advertisements," Third International Symposium on Cooperative Database Systems for Advanced Applications, Apr. 2001, pp. 102-109.
Opfer, "The History of the Internet According to Itself: A Synthesis of Online Internet Histories Available at the Turn of the Century," http://members.cox.net.opfer/index.html, Dec. 11, 1999, 64 pages.
Sato et al., "Distributed Information Retrieval by using Cooperative Meta Search Engines," Distributed Computing Systems Workshops, Apr. 2001, pp. 345-350.
Shen et al., "A Meta-search Method Reinforced by Cluster Descriptors," Second International Conference on Web Information Systems Engineering, Dec. 2001, vol. 1, pp. 125-132.
Spertus, "ParaSite: Mining Structural Information on the Web," The Sixth International World Wide Web Conference, Apr. 1997, 13 pages.
Spink, et al., "Overlap Among Major Web Search Engines," Third International Conference on Technology: New Generations, Apr. 2006, pp. 370-374.
Uehara, "Change Aware Distributed File System for a Distributed Search Engine," IEEE International Conference on Multimedia and Expo, Jun. 2004, vol. 3, pp. 1511-1514.
Non-final Office Action for U.S. Appl. No. 11/767,584 mailed Jun. 24, 2009, 9 pages.
Final Office Action for U.S. Appl. No. 11/767,598 mailed May 14, 2012, 14 pages.
Non-final Office Action for U.S. Appl. No. 11/767,598 mailed Nov. 2, 2011, 13 pages.
Final Office Action for U.S. Appl. No. 11/767,598 mailed Feb. 24, 2010, 12 pages.
Non-final Office Action for U.S. Appl. No. 11/767,598 mailed Aug. 27, 2009, 10 pages.
Notice of Allowance for U.S. Appl. No. 13/031,478 mailed Jul. 19, 2012, 7 pages.
Non-final Office Action for U.S. Appl. No. 13/031,478 mailed Feb. 2, 2012, 7 pages.
Notice of Allowance for U.S. Appl. No. 13/031,478 mailed Nov. 14, 2011, 7 pages.
Non-final Office Action for U.S. Appl. No. 13/031,478 mailed Jun. 28, 2011, 6 pages.
Notice of Allowance for U.S. Appl. No. 13/031,478 mailed Dec. 6, 2012, 8 pages.
Notice of Allowance for U.S. Appl. No. 09/351,747 mailed Feb. 23, 2007, 7 pages.
Non-final Office Action for U.S. Appl. No. 09/351,747 mailed Feb. 28, 2005, 8 pages.
Non-final Office Action for U.S. Appl. No. 09/351,747 mailed Apr. 6, 2004, 6 pages.
Non-final Office Action for U.S. Appl. No. 09/351,747 mailed Jun. 11, 2003, 8 pages.
Non-final Office Action for U.S. Appl. No. 09/351,747 mailed Dec. 3, 2002, 8 pages.
Notice of Allowance for U.S. Appl. No. 11/767,584 mailed Dec. 28, 2010, 8 pages.
Non-final Office Action for U.S. Appl. No. 11/767,584 mailed Jun. 30, 2010, 10 pages.
Final Office Action for U.S. Appl. No. 11/767,584 mailed Jan. 11, 2010, 11 pages.
Notice of Allowance for U.S. Appl. No. 11/767,563 mailed Nov. 3, 2010, 7 pages.
Non-final Office Action for U.S. Appl. No. 11/767,563 mailed Jul. 21, 2010, 13 pages.
Notice of Allowance for U.S. Appl. No. 11/767,632 mailed Jan. 27, 2011, 7 pages.
Non-final Office Action for U.S. Appl. No. 11/767,632 mailed Jul. 1, 2010, 11 pages.
Final Office Action for U.S. Appl. No. 11/767,632 mailed Jan. 11, 2010, 10 pages.
Non-final Office Action for U.S. Appl. No. 11/767,632 mailed Jun. 22, 2009, 7 pages.
Notice of Allowance for U.S. Appl. No. 12/418,386 mailed Mar. 18, 2011, 9 pages.
Non-final Office Action for U.S. Appl. No. 12/418,386 mailed Sep. 17, 2010, 12 pages.
Notice of Allowance for U.S. Appl. No. 11/767,569 mailed Sep. 21, 2009, 7 pages.
Non-final Office Action for U.S. Appl. No. 11/767,569 mailed Mar. 3, 2009, 7 pages.
Final Office Action for U.S. Appl. No. 11/767,569 mailed Sep. 25, 2008, 7 pages.
Non-final Office Action for U.S. Appl. No. 11/767,569 mailed Feb. 25, 2008, 12 pages.
Notice of Allowance for U.S. Appl. No. 11/767,650 mailed Oct. 22, 2008, 6 pages.
Non-final Office Action for U.S. Appl. No. 11/767,650 mailed Mar. 27, 2008, 12 pages.
International Search Report for PCT/CA98/00086 mailed Apr. 28, 1998, 4 pages.
Non-final Office Action for U.S. Appl. No. 13/723,707 mailed Feb. 25, 2013, 15 pages.
Anonymous, "Internet Access: Internet Marketing Revolution Begins in the US This September; Hyper System Promises New Cash Flow for Providers, Free Access for Users & a New Marketing Opportunity for Businesses," Edge: Work-Group Computing Report, vol. 17, Jun. 1996, pp. 14-16.
Anonymous, "Make Sure Search Engines Find Your Site, Options Include Buying Words, Advertising, and Careful Page Design," PR News, vol. 52, No. 19, May 6, 1996, 515 words.
Kohda, Y. et al., "A New Advertising Business Framework in the 1:1 Marketing," Transactions of the Information Processing Society of Japan, Jun. 1996, vol. 37, No. 6, pp. 1235-1236.
Kohda, Y. et al., "Ubiquitous Advertising on the WWW: Merging Advertisement on the Browser," International World Wide Web Conference, May 6-10, 1996, published in Computer Networks and ISDN Systems, May 1996, vol. 28, No. 7-11, pp. 1493-1499.
Myaeng, S. H. et al., "Integration of User Profiles: Models and Experiments in Information Retrieval," Information Processing and Management, vol. 26, No. 6, 1990, pp. 719-738.
Schreiber, F.A. et al., "Dynamic User Profiles and Flexible Queries in Office Document Retrieval Systems," Decision Support Systems, Jan. 1, 1989, vol. 5, No. 1, pp. 13-28.
Non-final Office Action for U.S. Appl. No. 13/723,642 mailed Mar. 21, 2013, 13 pages.
Non-final Office Action for U.S. Appl. No. 13/724,147 mailed Mar. 22, 2013, 10 pages.
Notice of Allowance for U.S. Appl. No. 13/724,209 mailed Mar. 27, 2013, 8 pages.
Non-final Office Action for U.S. Appl. No. 13/724,495 mailed Apr. 1, 2013, 12 pages.
Non-final Office Action for U.S. Appl. No. 13/724,369 mailed Apr. 5, 2013, 15 pages.
Non-final Office Action for U.S. Appl. No. 13/724,076 mailed Apr. 9, 2013, 11 pages.
Non-final Office Action for U.S. Appl. No. 13/845,955 mailed Jun. 12, 2013, 23 pages.
Notice of Allowance for U.S. Appl. No. 13/031,478 mailed Jun. 7, 2013, 41 pages.
Lycos, Inc., "Quarterly Report Pursuant to Section 13 or 15(d) of the Securities Exchange Act of 1934: For the Quarterly period ended Oct. 31, 1996," Form 10-Q, filed Dec. 16, 1996, 15 pages.
Yahoo! Inc., "Annual Report Pursuant to Section 13 or 15(d) of the Securities Exchange Act of 1934: For the fiscal year ended Dec. 31, 1996," Form 10-K, filed Mar. 31, 1997, 284 pages.
Non-final Office Action for U.S. Appl. No. 13/723,670 mailed Mar. 21, 2013, 8 pages.
Chavarria, G., "Information Retrieval Models Using Queries and User Profiles," 3rd International Conference on Computer Science, Jun. 20-24, 1983, pp. 113-130 (abstract only).
Yager, R.R, "Intelligent Agents on the World Wide Web," Workshop on Flexible Query—Answering Systems, May 22-24, 1996, pp. 289-306 (abstract only).
Final Office Action for U.S. Appl. No. 11/767,598, mailed Jun. 28, 2013, 13 pages.

(56) References Cited

OTHER PUBLICATIONS

Notice of Allowance for U.S. Appl. No. 13/724,209, mailed Jul. 2, 2013, 9 pages.
Non-Final Office Action for U.S. Appl. No. 13/031,478, mailed Sep. 6, 2013, 8 pages.
Notice of Allowance for U.S. Appl. No. 13/723,707, mailed Sep. 11, 2013, 11 pages.
Notice of Allowance for U.S. Appl. No. 13/724,209, mailed Dec. 4, 2013, 10 pages.
Final Office Action for U.S. Appl. No. 13/845,955, mailed Jan. 9, 2014, 27 pages.
Non-final Office Action for U.S. Appl. No. 13/031,478 mailed Apr. 2, 2014, 14 pages.
Author Unknown, "West Group expands Dow Jones alliance, offers new products," Information Today, vol. 15, No. 6, Jun. 1, 1998, 4 pages.
Author Unknown, "West Group, Dow Jones Expand Strategic Alliance Companies Poised for Product, Market Expansion; Renewed Relationship Includes Exclusive U.S. Legal Market Rights to the Wall Street Journal," PR Newswire, Apr. 9, 1998, 3 pages.
Author Unknown, "EDGAR Direct ATS Introduced by Federal Filings," Online Product News, vol. 17, No. 4, Apr. 1998, 2 pages.
Author Unknown, "Careers.wsj.com Redesigns Site, Provides Readers New In-Depth, Compelling Content," Business Wire, Jan. 27, 1998, 3 pages.
Author Unknown, "Federal Filings Introduces EDGAR Direct ATS, a Powerful New Search Tool," Business Wire, Jan. 26, 1998, 2 pages.
O'Leary, Mick, "DJI rounds out Dow Jones Web migration; the Dow Jones Interactive service is wide, deep, and Web-smart," Information Today, vol. 15, No. 1, Jan. 1998, 6 pages.
Author Unknown, "Dow Jones Interactive Provides World's Most Comprehensive Electronic Collection of U.S. Newspapers; Offers More of the Top 100 Newspapers Than Any Other Online Service," Business Wire, Dec. 1, 1997, 3 pages.
Author Unknown, "Dow Jones and DIALOG challenge Web search engines; Dow Jones Interactive Publishing and Knight-Ridder Information Inc., Information Today sponsors contest, Internet Challenge," Information Today, vol. 14, No. 10, Nov. 1, 1997, 2 pages.
Hane, Paula J., "A full-featured Web service evolves from News/Retrieval; Dow Jones Interactive makes its Web debut; Dow Jones Interactive Publishing," Information Today, vol. 14, No. 9, Oct. 1, 1997, 2 pages.
Author Unknown, "Dow Jones Helps Financial Professionals Meet Muni-Bond Compliance Standards With Muller Data/TSIS Real-Time Disclosure," Business Wire, Sep. 16, 1997, 2 pages.
Author Unknown, "Dow Jones News/Retrieval to Debut on the Web," Information Today, vol. 14, No. 6, Jun. 1, 1997, 3 pages.
Author Unknown, "Dow Jones unveils new, unique knowledge indexing system," Business Wire, Apr. 17, 1997, 2 pages.
Author Unknown, "Dow Jones Publications Library moves to the Web; Dow Jones and Company Inc. offers business news on World Wide Web," Information Today, vol. 14, No. 3, Mar. 1, 1997, 2 pages.
Author Unknown, "Dow Jones moves its vast Dow Jones News/Retrieval Publications Library to the Web," Business Wire, Jan. 16, 1997, 2 pages.
Author Unknown: "Dow Jones News/Retrieval adds international, business wires; Dow Jones Business Information Services adds Dow Jones Australia/New Zealand Report, Dow Jones Asian Equities Report, Dow Jones Commodities Service and Dow Jones Money Management Alert," Information Today, vol. 13, No. 11, Dec. 1, 1996, 2 pages.
Author Unknown, "Dow Jones News/Retrieval Adds Exclusive International and Business/Financial Newswires," Business Wire, Oct. 16, 1996, 3 pages.
Author Unknown, "Dow Jones Business Information Services launches web-based business directory," Business Wire, Oct. 8, 1996, 2 pages.
Author Unknown, "Dow Jones Business Center debuts on America Online; news on companies, industries and markets," Information Today, vol. 13, No. 9, Oct. 1, 1996, 2 pages.
Author Unknown, "Dow Jones Technology News Now Available on Giga Information Group's Website," PR Newswire, Jul. 12, 1996, 3 pages.
Author Unknown, "Dow Jones does a makeover on News/Retrieval service," Information Today, vol. 13, No. 6, Jun. 1, 1996, 3 pages.
Quint, Barbara, "Assume the position, take the consequences . . . in which Dow Jones News/Retrieval's exclusive lock on the Wall Street Journal is scrutinized and found to be irritating," Information Today, vol. 13, No. 6, Jun. 1, 1996, 4 pages.
Author Unknown, "Dow Jones Extends Leadership as Business Information Publisher; Sets New Industry Standard with Transformed Business Online Service," Business Wire, May 14, 1996, 3 pages.
Author Unknown, "Idd Delivers News Agent for the Dow Jones Telerate Network," PR Newswire, Jun. 13, 1995, 2 pages.
Author Unknown, "Personal Library Software Announces Release of Dow Jones News/Retrieval Text Library," PR Newswire, Jun. 12, 1995, 2 pages.
Author Unknown, "Dow Jones launches faster, more flexible text library; Provides customers with more searching power and control to quickly search millions of documents," Business Wire, Jun. 12, 1995, 2 pages.
Author Unknown, "Dow Jones enhances News/Retrieval text library," Information Today, vol. 11, No. 11, Dec. 1, 1994, 2 pages.
Author Unknown, "West Publishing and Dow Jones to Integrate Dow Jones News/Retrieval and WESTLAW for the Legal Market," Business Wire, May 17, 1994, 2 pages.
Author Unknown, "Dow Jones to provide news service for the Internet; DowVision now available to businesspeople around the world using WAIS technology," Business Wire, Jan. 26, 1994, 2 pages.
Author Unknown, "Dow Jones releases TextService Plus," Information Today, vol. 10, No. 11, Dec. 1, 1993, 2 pages.
Author Unknown, "Provides Windows Access to 1,300 Publications Online," Business Wire, Nov. 1, 1993, 2 pages.
Ingebretsen et al., "The Los Angeles Times: a special kind of database; part two: Dow Jones News Retrieval and DataTimes," Database Searcher, vol. 8, No. 3, Apr. 1, 1992, 6 pages.
Hogan, Tom, "Dow Jones users gain access to Dun's Market Identifiers," Information Today, vol. 9, No. 2, Feb. 1, 1992, 3 pages.
Author Unknown, "N/R's mix and match enhanced; Dow Jones News/Retrieval," Information Today, vol. 9, No. 1, Jan. 1, 1992, 1 page.
Author Unknown, "Clipping service from Dow Jones," Database Searcher, vol. 7, No. 5, Jun. 1, 1991, 2 pages.
Author Unknown, "Dow Jones and NewsNet join AIIP vendor program," Database Searcher, vol. 7. No. 2, Feb. 1, 1991, 2 pages.
Author Unknown, "Dow Jones clipping service," Information Today, vol. 8, No. 1, Jan. 1, 1991, 2 pages.
Author Unknown, "Dow Jones News/Retrieval Introduces Dow Jones Clipping Service," PR Newswire, Dec. 10, 1990, 2 pages.
O'Dwyer, Jack, "Dow Jones Unites Newswires into One Service," Jack O'Dwyer's Newsletter, vol. 23, No. 38, 1 page.
Author Unknown, "Computerized stock quotes and clipping service," Lotus, vol. 6, No. 8, Aug. 1, 1990, 1 page.
Author Unknown, "Dow Jones News/Retrieval, Datatimes Combine Publications on Shared Computer System," PR Newswire, Jul. 2, 1990, 2 pages.
Webb, Joseph A., "DataTimes and Dow Jones share files," Information Today, vol. 7, No. 7, Jul. 1, 1990, 2 pages.
Author Unknown, "DataTimes announces major new search features, price cuts," Database Searcher, vol. 6, No. 5, Jun. 1, 1990, 2 pages.
Author Unknown, "Correction—GESCAN-Dow Jones," PR Newswire, May 2, 1990, 3 pages.
Author Unknown, "GESCAN International Announces Strategic Alliance with Dow Jones, Unveils New Real-Time News System," PR Newswire, May 1, 1990, 3 pages.
Author Unknown, "IAC adds over 200 magazines to Dow Jones News/Retrieval DowQuest," Information Today, vol. 7, No. 1, Jan. 1, 1990, 2 pages.
Bouchon-Meunier et al. (eds.), "Advances in Intelligent Computing—IPMU '94," Berlin, Springer, 1995, 326 page.

(56) References Cited

OTHER PUBLICATIONS

Church et al., "Commercial Applications of Natural Language Processing," Communications of the ACM, vol. 38, No. 11, Nov. 1995, pp. 71-79.
Fox, Edward A., "Some Considerations for Implementing the SMART Information Retrieval System under UNIX," Department of Computer Science, Virginia Tech, Sep. 1983, 93 pages.
Fox, Edward Alan, "Extending the Boolean and Vector Space Models of Information Retrieval with P-Norm Queries and Multiple Concept Types," thesis for the Graduate School of Cornell University, Aug. 1983, 390 pages.
Frook, John Evan, "Search-engine advertising—Web marketing push," CommunicationsWeek, Oct. 9, 1995, 2 pages.
Fox et al., "Integrating Search and Retrieval with Hypertext," Chapter 21, Hypertext/Hypermedia Handbook, pp. 329-355.
Author Unknown, "Freeloader releases version 2.0; High-bandwidth, personalized Web content delivered offline to PC desktops with redesigned interface and screen saver,", Business Wire, Sep. 30, 1996, 2 pages.
Fox, Edward A., "Development of the Coder System: A Testbed for Artificial Intelligence Methods in Information Retrieval," Information Processing & Management, vol. 23, No. 4, 1987, pp. 341-366.
Fox et al., "Users, User Interfaces, and Objects: Envision, a Digital Library," Journal of the American Society for Information Science, vol. 44, No. 8, 1993, pp. 480-491.
Furnas et al, "The Vocabulary Problem in Human-System Communication," Communications of the ACM, vol. 30, No. 11, Nov. 1987, pp. 964-971.
Inktomi, "The Inktomi Technology behind HotBot," Inktomi Corporation, 1996, http://www.inktomi.com/whitepap.html, 5 pages.
Inktomi, "From the Inktomi Team," Inktomi Corporation, 1996, http://www.inktomi.com/main_info.html, 1 page.
Inktomi, "Company," Inktomi Corporation, 1996, http://www.inktomi.com/company_info.html, 1 page.
Inktomi, "Products," Inktomi Corporation, 1996, http://www.inktomi.com/products_info.html, 1 page.
Inktomi, "Technology," Inktomi Corporation, 1996, http://www.inktomi.com/technology_info.html, 1 page.
Heller et al., "So You Wanna Design for the Web," Interactions, Mar. 1996, pp. 19-23.
Green et al., "Towards Practical Interface Agents which Manage Internet-Based Information," Department of Computer Science, King's College, University of Aberdeen, Scotland, 1995, 14 pages.
Campbell et al., "HNC Software and Infoseek Announce Web Partnership," press release, May 6, 1996, http://web.archive.org/web/19961023021103fw_/http://www.aptex.com/infosee2.htm, 2 pages.
Hoffman et al., "Internet a," Communications of the ACM, vol. 39, No. 12, Dec. 1996, pp. 36-46.
Author Unknown, "Hyper System," 3 pages.
Author Unknown, Table of Contents, Communications of the ACM, vol. 39, No. 6, Jun. 1996, 3 pages.
Hoffman et al., "Marketing in Hypermedia Computer-Mediated Environments: Conceptual Foundations," Working Paper No. 1, Research Program on Marketing in Computer-Mediated Environments, Owen at Vanderbilt, Jan. 1, 1995, 38 pages.
Laursen, Jesper Vissing, "Search engines and advertising: An unholy alliance?" Online Information 97, 21st International Online Information Meeting Proceedings, London, Dec. 9-11, 1997, pp. 271-274.
Lang, Ken, "NewsWeeder: Learning to Filter Netnews," Proceedings of the 12th International Machine Learning Conference; San Mateo: Morgan Kaufmann Publishers, 1995, pp. 331-339.
Author Unknown, "I PRO and DoubleClick Partner to Deliver Next Generation in Ad Targeting and Accountability," PR Newswire, Jun. 20, 1996, 2 pages.
Salton et al., "Introduction to Modern Information Retrieval," New York: McGraw-Hill, 1983, 472 pages.
Laudon, Kenneth C., "Markets and Privacy," Communications of the ACM, vol. 39, No. 9, Sep. 1996, pp. 92-104.

Kraft, Donald H., "Advances in Information Retrieval," ACM 82 Panel Session, Department of Computer Science, Louisiana State University, Baton Rouge, no date, 2 pages.
Lee et al., "On the Evaluation of Boolean Operators in the Extended Boolean Retrieval Framework," SIGIR '93 Proceedings of the 16th Annual International ACM SIGIR Conference on Research and Development in Information Retrieval, New York: ACM, 1993, pp. 291-297.
Levy et al., "Querying Heterogeneous Information Sources Using Source Descriptions," VLDB '96 Proceedings of the 22nd International Conference on Very Large Data Bases; San Francisco: Morgan Kaufman, 1996, 26 pages.
Hua Li et al. (eds.), "Fuzzy Logic and Intelligent Systems," Boston: Kluwer Academic, 1995, 237 pages.
Little, Thomas D.C., "Commerce on the Internet," IEEE Multimedia, Winter 1994, pp. 74-78.
Myaeng et al., "Towards an Intelligent and Personalized Retrieval System," ISMIS '86 Proceedings of the ACM SIGART International Symposium on Methodologies for Intelligent Systems, New York: ACM, 1986, pp. 121-129.
Author Unknown, "C Net Online Selects NetGravity AdServer to Strengthen Its Advanced Advertising Capabilities; C NET Joins Elite Group of Web Advertising Venues Using NetGravity Technology and Extensible API," PR Newswire, Apr. 18, 1996, 2 pages.
Author Unknown, "Leading Internet Advertising Software Producer, NetGravity, Launches Co-Marketing Program; Media Planners and Buyers Request Web Sites "Powered by NetGravity" for Ads in the Right Place at the Right Time, Along with Timely, Accurate Ad Performance Reports," Business Wire, Jan. 13, 1997, 3 pages.
Author Unknown, "GNN Announces Partnerships to Deliver Service, Functionality and Measurement to WebCrawler Advertisers; Katz, Net gravity, and I/Pro Combination to Set New Standard in Web Advertising," PR Newswire, Jun. 24, 1996, 3 pages.
Author Unknown, "NetGravity AdServer Chosen by GNN to Standardize WebCrawler Advertising Management; GNN's WebCrawler is the first to capitalize on newly formed alliance between NetGravity and I/PRO," Business Wire, Jun. 17, 1996, 3 pages.
Author Unknown, "NetGravity Announces AdServer 2.0, Raises the Standard in Online Advertising Management Software; Industry-Leading Advertising Management Software Gives Sites Enhanced Targeting Ability, Modular Architecture, Greater Performance and Extensibility," Business Wire, Oct. 14, 1996, 3 pages.
Author Unknown, "NetGravity Launches AdServer, the Premier Advertising Management System for World Wide Web Publishers; Yahoo! Signs on as the First Web Site to Benefit from NetGravity AdServer's Fully Automated Scheduling, Placing and Tracking Capabilities," PR Newswire, Jan. 31, 1996, 3 pages.
Author Unknown, "Pathfinder Web Site Installs NetGravity AdServer; Contract Provides Pathfinder with Online Advertising Management System," PR Newswire, Feb. 26, 1996, 2 pages.
Author Unknown, "Object Design Partners with Industry Leaders to Provide Web Developers with Richest Possible Multimedia Data Management Solutions; Company Launches New Object Manager Developer Program," PR Newswire, Dec. 9, 1996, 3 pages.
Author Unknown, "NetGravity Launches AdServer 2.1," Business Wire, Jan. 13, 1997, 3 pages.
Author Unknown, "NetGravity Teams with CyberCash to Advance Business Opportunities on the Internet; Companies Announce Plans to Offer Complete Solutions for Web Commerce and Advertising," PR Newswire, Apr. 3, 1996, 3 pages.
Author Unknown, "New Century Network Selects NetGravity AdServer Network to Manage and Deliver Targeted, National Online Advertising for Newspaper Affiliates; Leading Media Companies Poised to Receive National Ads from NCN," Business Wire, Feb. 18, 1997, 2 pages.
Author Unknown, "Mining Company Finds New Net Business Model," Newsbytes, Feb. 10, 1997, 2 pages.
Author Unknown, "Digest: AT&T technology unit becomes Lucent Technologies," The Star-Ledger (Newark, N.J.), Apr. 8, 1996, final ed., 2 pages.

(56) References Cited

OTHER PUBLICATIONS

Author Unknown, "U S West Media Group to DIVE IN (SM) to Local Online Services; New Service Will Provide Communities With Entertaining Content and Practical Information to Simplify Everyday Activities," PR Newswire, Oct. 1, 1996, 6 pages.

Author Unknown, "NetGravity Partners with Open Market for Internet Advertising and Commerce Solutions; Technology and Marketing Alliance Enhances Opportunities for Customers," PR Newswire, May 12, 1996, 2 pages.

Author Unknown, "NetGravity and I/PRO Form Strategic Alliance, Setting Standard for Internet Advertising Management and Measurement; Technology and Marketing Alliance Enhances Products and Services from Both Companies; GNN's WebCrawler will be the first to benefit," Business Wire, Jun. 17, 1996, 3 pages.

Author Unknown, "NetGravity AdServer Chosen by 21 New Customers to Manage Advertising on Their Web Sites; Sites Turn to Leading Advertising Management Software to Establish and Support Online Presence," Business Wire, Feb. 12, 1997, 2 pages.

Author Unknown, "The Mining Company launches new business model on the Internet," Business Wire, Feb. 10, 1997, 3 pages.

Author Unknown, "NetGravity and Netscape Team to Provide Leading Web Advertising and Publishing Solution," Business Wire, Jan. 29, 1997, 2 pages.

Author Unknown, "I/PRO to Audit Infoseek Web Site; Infoseek to Use I/PRO Audit Solutions to Support Web Advertising," PR Newswire, Sep. 18, 1996, 2 pages.

Author Unknown, "NetGravity AdServer Delivers over One Billion Ads on the Web's Most Volume- and Content-Intensive Sites; Milestone Proves AdServer's Success in Delivering Scalable, High Performance Ad Management Software," Business Wire, Nov. 5, 1996, 2 pages.

Author Unknown, "Extra! Extra! NetGravity AdServer Means Revenue to Traditional Publications Online; National Geographic Online, Forbes, Hearst Corp.'s HomeArts, The Chicago Tribune Choose the NetGravity AdServer to Manage Advertising for Online Presence," Business Wire, Nov. 25, 1996, 2 pages.

Author Unknown, "Lycos' HotBot Reveals List of Web Searchers' Most Popular Literary Authors; Modern Library's Controversial Best Novels of the Century Ranked by Hotbot's Millions of Monthly Searchers," PR Newswire, Jul. 15, 1999, 2 pages.

Author Unknown, "HotBot's Search Smarter Campaign Recognized as Smartest Technology Advertising Campaign in Silicon Valley; Wired Digital Takes Home Prestigious American Marketing Association Sherlock Award for Best Advertising Campaign," PR Newswire, Jun. 16, 1999, 2 pages.

Author Unknown, "Autoweb.com Secures Premium Promotional Positioning on HotBot Search Site; Exclusive Integrated New Car Marketing Campaign Makes Autoweb.com Easily Accessible to Millions of Users," PR Newswire, Jun. 14, 1999, 2 pages.

Author Unknown, "Top Search Site HotBot Reveals Web's Most Popular 'Star Wars' Web Sites and Characters," Apr. 28, 1999, 2 pages.

Author Unknown, "Direct Hit's Popularity Engine Helps HotBot Win CNET's 'Search Engine Shoot Out,'" Business Wire, Apr. 21, 1999, 2 pages.

Author Unknown, "Register.com and HotBot Ink Exclusive Domain Search Deal; Register.com Provides HotBot with Leading Domain Name Registration Services," Business Wire, Apr. 20, 1999, 2 pages.

Author Unknown, "CNET Names HotBot Best Search Engine on the Web for Second Consecutive Year," PR Newswire, Apr. 12, 1999, 2 pages.

Author Unknown, "SecureTax.com Sponsors HotBot Tax Guide," Business Wire, Mar. 23, 1999, 2 pages.

Author Unknown, "Top Search Site HotBot Reveals Web's Most Popular Oscar Picks; 'Shakespeare,' Paltrow and Hanks Most Likely Oscar Contenders," PR Newswire, Mar. 18, 1999, 2 pages.

Author Unknown, "New HotBot Tax Guide Provides Fast Online Access to Tax Forms in All 50 States; Top-Rated Search Site Eases Apr. 15 Anxiety with Smart Online Tax Reference Guide," PR Newswire, Mar. 10, 1999, 2 pages.

Author Unknown, "HotBot Enlists Millions of Web Users to Enhance Search Results; First Major Search Site to Employ New Popularity Technology to Track Web's Most Popular Sites," PR Newswire, Feb. 22, 1999, 2 pages.

Author Unknown, "HotBot's Television Campaign Success Prompts Expansion into Radio and New TV Markets; Lycos Network Site Introduces Third Wave of National Brand-Building 'Search Smarter' Campaign to Twelve Radio and TV Markets," PR Newswire, Feb. 8, 1999, 2 pages.

Author Unknown, "You've Got Mail! So Now What?—HotBot's Valentine's Gift Guide Helps Fan the Flames of Cyber Romance; Tuscany Bike Trip for Two and 'Name a Star' Top HotBot's Picks for Best Online Valentine's Gifts," PR Newswire, Jan. 26, 1999, 2 pages.

Author Unknown, "The Cobalt Group Forms Marketing Partnership with HotBot to Promote Car Dealers' Web Sites," Business Wire, Jan. 14, 1999, 2 pages.

Author Unknown, "Last Minute Relief for Weary Cyber-Santas; HotBot Unwraps Web's Most Popular Holiday Toys for 1998; Furby and Lego Mindstorms Top Consumers' Online Shopping Lists," PR Newswire, Dec. 23, 1998, 2 pages.

Author Unknown, "Don't Leave Your Cyber-Christmas to Chance—HotBot Helps Online Holiday Revelers 'Search Smarter' with New Holiday Site Directory and Gift Guide; Renowned Wired Digital Editorial Team Picks Backyard Ice Rink and Global Positioning System Among Hottest Holiday Gifts," Dec. 1, 1998, 2 pages.

Author Unknown, "HotBot Search Site Expands to Offer Free Universal Email and Homepages; Kick-Off Promotion Offers Web Surfers a Chance to Win a Toyota RAV4 and Schwinn Race Team Mountain Bikes," PR Newswire, Nov. 23, 1998, 2 pages.

Author Unknown, "Even in Cyberspace, Turkey's a Winner—HotBot Serves Up Web's Most Popular Thanksgiving Recipe Sites and Food Dishes," PR Newswire, Nov. 23, 1998, 2 pages.

Author Unknown, "'PC Computing' Magazine Names HotBot Best Search Site on the Web for Second Year in a Row; HotBot Becomes Editors' Top-Search Pick for 16th Consecutive Issue of Influential Business Computing Publication," PR Newswire, Nov. 16, 1998, 2 pages.

Author Unknown, "HotBot Takes Top Honors with Information Award of Excellence at 'NewMedia' Magazine's Invision 98 Awards; Top-Rated Search Site Also Named Gold Medal Winner in the Search Engine/Portal Category," PR Newswire, Nov. 13, 1998, 2 pages.

Author Unknown, "HotBot's 'Search Smarter' TV Campaign Expands into Three New Major Media Markets; Second Phase of National Brand-Building Campaign Adds Web-Savvy Viewers in Boston, Chicago, and Washington," PR Newswire, Nov. 11, 1998, 2 pages.

Author Unknown, "American Center for Design Recognizes HotBot and Wired News for Excellence in Web Design," PR Newswire, Nov. 9, 1998, 2 pages.

Author Unknown, "Wired Digital's HotBot, a Lycos Network Site, Reveals Web's Most Popular Halloween Monsters, Ghouls, and Goblins and All-Time Top Horror Films; 'Dracula' and 'Halloween: The Movie' Are among the Top Halloween Haunts and Films Requested by Web Surfers of Popular Web Search Site," PR Newswire, Oct. 29, 1998, 3 pages.

Author Unknown, "Wired Digital, a Member of the Lycos Network, Selects At Hand Network to be Exclusive Yellow Pages Provider for HotBot Search Site; HotBot to Feature Millions of Regional Yellow Page Listings from Ameritech, BellSouth, SBC Communications, and US West Joint Venture," PR Newswire, Oct. 19, 1998, 2 pages.

Author Unknown, "HotBot Takes Consumers 'Under the Hood' of Search Portal Competitors for Debut of National on-Air Branding Campaign; First TV Ad Campaign to Help Users Choose between Web Search Services; Goodby Creative Spots Educate Users to 'Search Smarter' with HotBot," PR Newswire, Oct. 5, 1998, 2 pages.

Author Unknown, "Wired Digital Pumps up HotBot's Search Portal Prowess to Ease Consumer Frustration with Search; Enhanced Search Focus Meets Consumer Needs, Counters Portal Competitors," PR Newswire, Sep. 29, 1998, 3 pages.

Author Unknown, "KidFlix.com Teams up with Hotbot to Provide Family Videos in New Kids and Family Shopping Category," Business Wire, Sep. 28, 1998, 3 pages.

(56) References Cited

OTHER PUBLICATIONS

Author Unknown, "MovieStreet Launches KidFlix.com; Internet's First Retailer to Address $5 Billion Family-oriented Video Market," Business Wire, Sep. 28, 1998, 4 pages.
Author Unknown, "HotBot Signs Distribution Agreements with Yahoo! and Netscape; Web's Best-Rated Search Site Now Available to Yahoo! and Netscape Users," PR Newswire, Sep. 14, 1998, 2 pages.
Author Unknown, "Wired Digital's HotBot Shopping Directory to Deliver an Estimated 6 Million Customers to Spree.com Internet Retailer to Offer Free, Unlimited Sized Web Sites," Business Wire, Sep. 2, 1998, 2 pages.
Author Unknown, "Hilton Expands Online Presence by Joining Wired Digital's HotBot Shopping Directory; Major Hotel Company and Premier Online Shopping Directory Form Exclusive Online Partnership," PR Newswire, Aug. 31, 1998, 2 pages.
Author Unknown, "Web Surfers' Interests Sway from Box-Office Top-Ten 'Armageddon,' 'Zorro,' and Female Leads Diaz, Barrymore, and Tyler Going Strong Online," Aug. 6, 1998, 3 pages.
Author Unknown, "AT&T WorldNet, Ameritech, and Sympatico of Canada Select Wired Digital to Provide Premium Web Search Services and Technology Content; HotBot Search Engine Featured on Leading National and Regional Internet Access Services," PR Newswire, Aug. 3, 1998, 2 pages.
Author Unknown, "Wired Digital and Goodby, Silverstein & Partners Team up for HotBot Brand-Building Campaign; The Web's Best-Rated Navigation Portal to Launch Major Market Advertising Campaign in October," PR Newswire, Jul. 27, 1998, 3 pages.
Author Unknown, "Top Search Engine Reveals Most Popular Cities, Countries, and Sports; New York, Canada—and Golf—at Top of Web Users' Interest," PR Newswire, Jul. 21, 1998, 3 pages.
Author Unknown, "Allapartments.com Moves in With HotBot; Co-Branded Portal Deal Streamlines Apartment Hunting Process," Business Wire, Jul. 21, 1998, 2 pages.
Weise, Elizabeth, "Lycos keeps surfers afloat: Users prefer directory sites to search engines for their ease in navigating," USA Today, Jul. 15, 1998, final ed., 3 pages.
Author Unknown, "Wired Digital to Provide Premium Search Services and Technology Content to Leading ISPs; HotBot Featured as Premier Search Engine on EarthLink and MindSpring," PR Newswire, Jun. 29, 1998, 2 pages.
Author Unknown, "HomeShark Links up with Wired Digital," National Mortgage News, Jun. 22, 1998, 1 page.
Author Unknown, "'Pc World' Declares HotBot 'Best Web Search Site,'" PR Newswire, Jun. 17, 1998, 2 pages.
Author Unknown, "HotBot Chosen as 'PC Computing's' Top-Pick Search Engine 12 Months in a Row," PR Newswire, Jun. 11, 1998, 2 pages.
Author Unknown, "Wired Digital Expands Commitment to E-commerce with Launch of HotBot Shopping Directory; Best-Rated Search Engine Expands Consumer Shopping Resources with Easy Access to Online Merchants and Services," PR Newswire, Jun. 2, 1998, 3 pages.
Author Unknown, "Wired Digital and Junglee Team up to Provide One-Stop Comparative Shopping Service for New HotBot Shopping Directory; 7.5 Million HotBot Users Can Now Easily Find Products from Many Merchants in One Place," PR Newswire, Jun. 2, 1998, 3 pages.
Author Unknown, "Wired Digital Announces E-commerce Partnerships with Leading Online Retailers; HotBot Shopping Directory Brings Top Brands to Web's Most Pro-Commerce Audience," PR Newswire, Jun. 2, 1998, 2 pages.
Author Unknown, "HomeShark Creates Homes & Loans Search Service with HotBot; Co-branded Deal Improves Home Purchase Process for Customers," Business Wire, Jun. 2, 1998, 2 pages.
Author Unknown, "Wired Digital Goes Shopping Via HotBot," Newsbytes, Jun. 2, 1998, 2 pages.
Author Unknown, "HotBot Traffic Increase Largest of All Major Search Sites; HotBot and Wired Digital Show Substantial Popularity Growth in Latest Audience Data by Relevant Knowledge," PR Newswire, May 17, 1998, 2 pages.
Author Unknown, "SmartMoney Magazine Chooses HotBot as Web's Best Search Engine," PR Newswire, Apr. 29, 1998, 2 pages.
Author Unknown, "Infonautics Teams up with Wired Digital's HotBot to Offer Subscription-Based Premium Online Research Services; Web's Largest Search Engine Now Offers Users Access to Premium Research Service," PR Newswire, Apr. 17, 1998, 2 pages.
Author Unknown, "Wired's HotBot and ZDNet License Deja News' Discussion Forum Services; Users Gain One-Click Access to Deja News' Extensive Discussion and Knowledge Resources," Business Wire, Mar. 10, 1998, 3 pages.
Author Unknown, "First Virtual Holdings Contributes VirtualTAG to United Cerebral Palsy for Online Donations; Unique Relationship Is First Ever Geared to Increase Funding and Ease of Giving on the Internet," Business Wire, Sep. 23, 1997, 4 pages.
Author Unknown, "Individual Investor Group Announces Initial Sponsorship Agreements for Its Individual Investor Online Web Site," Business Wire, Sep. 16, 1997, 2 pages.
Author Unknown, "They Bounce, Slither, and Walk Thomas Register on the Internet Breathes Life into New Animated Online Advertising Campaign," PR Newswire, Sep. 9, 1997, 2 pages.
Williams, Martyn, "NTT, DoubleClick Form Japanese Internet Advertising Venture," Newsbytes, Aug. 20, 1997, 2 pages.
Author Unknown, "DoubleClick Launches First International Web Advertising Network in Japan; Joint Venture in Step with Company's Aggressive International Expansion; Japanese Partners Comprise Leaders in Telecommunications, Technology and Marketing," PR Newswire, Aug. 19, 1997, 3 pages.
Needham, Kirsty, "In search of the Aussie ad dollar," Sydney Morning Herald (Australia), Aug. 19, 1997, late ed., 3 pages.
Taylor, Neil, "DoubleClick Closes in on Asian Advertising Market," Newsbytes, Aug. 5, 1997, 2 pages.
Rankin, Bob, "Computer 102 / Class Recesses for a Cookie Break," Newsday, Jul. 20, 1997, Nassau and Suffolk ed., 3 pages.
McElvogue, Louise, "Advertisers to Pay on Results," The Guardian (London), Jul. 3, 1997, 2 pages.
Author Unknown, "DoubleClick Launches First Performance-Based Web Advertising Solution; DoubleClick Direct (SM) to Provide Web Marketing Opportunities for Direct Response Advertisers," PR Newswire, Jun. 27, 1997, 3 pages.
Author Unknown, "'Hide Your Cookies'; Luckman Interactive Addresses Privacy Protection Concern of Internet Users by Offering Free Utility," PR Newswire, Jun. 24, 1997, 2 pages.
Author Unknown, "The 'Awesome Foursome' to Highlight Summit '97; Four of New York's Top New Media Concerns to Be Showcased at Technology Summit," PR Newswire, Jun. 24, 1997, 3 pages.
Moon, Peter, "Tracked by trail of telltale cookie crumbs," Australian Financial News, Jun. 20, 1997, late ed., 2 pages.
Author Unknown, "DoubleClick Closes $40 Million Private Financing Round; Investment Is among Largest for Single, Private Internet Company; Greylock, Bain and ABS Capital Lead the Pack of Company's New Blue-Chip Investors," PR Newswire, Jun. 11, 1997, 3 pages.
Ono, Yumiko, "Advertising: Vote of Confidence for Net," Wall Street Journal, Jun. 11, 1997, 1 page.
Author Unknown, "Individual Investor Group Launches IIonline, Most Comprehensive Internet Investment Resource Available," Business Wire, May 7, 1997, 2 pages.
Foderaro, Lisa W., "Metro Business; Small-Business Awards," The New York Times, May 2, 1997, late ed., 1 page.
Nerney, Chris, "Are cookies bad for you? Privacy groups and electronic commerce proponents spar over plan to muzzle Web tracking tool," Network World, Apr. 28, 1997, 2 pages.
Author Unknown, "New Sites Sign with I/PRO," PR Newswire, Apr. 17, 1997, 2 pages.
Author Unknown, "iEC award winners prove electronic commerce solutions are revolutionizing the business world," Business Wire, Mar. 19, 1997, 4 pages.
Author Unknown, "SOFTBANK Interactive Marketing Reaches Nearly Half of All Active Web Users According to PC Meter; Reach Exceeds Closest Competitor by 81.9 Percent," PR Newswire, Mar. 11, 1997, 3 pages.

(56) References Cited

OTHER PUBLICATIONS

Author Unknown, "Online Products and Services," Marketing Tools, Mar. 1997, 2 pages.
Author Unknown, "DoubleClick Expanding International Operations; Leading Internet Advertising Network Supports Growing Demand for Worldwide Online Advertising," PR Newswire, Feb. 25, 1997, 2 pages.
Bosworth, David, "Canada Trust debuts EasyWeb Internet transactions," Strategy, Feb. 17, 1997, 2 pages.
Elliott, Stuart, "An interactive advertising network is offering tutorials to plug the potential of cyberpitches," The New York Times, Jan. 20, 1997, late ed.—final, 2 pages.
Author Unknown, "Pipeline," InfoWorld, Jan. 6, 1997, 2 pages.
Author Unknown, "Business Briefcase," The Boston Herald, Dec. 19, 1996, first ed., 2 pages.
Author Unknown, "DoubleClick Named Advertising Sales and Distribution Partner for AltaVista Search Site; Leading Internet Ad Network Teams with Net's Largest Search Engine," PR Newswire, Dec. 18, 1996, 2 page.
Thompson, Bill, "Digital Footprints; For many Net users the first sign that they have been tracked is unwanted e-mail. Bill Thompson examines the trail we all leave in cyberspace," The Guardian (London), Nov. 21, 1996, 2 pages.
Moukheiber, Zina, "DoubleClick is watching you," Forbes, Nov. 4, 1996, 3 pages.
Weber, Thomas E., "Advertising: Ad-Placement Software Helps Find the Web's Hot Spots," Wall Street Journal, Oct. 23, 1996, 1 page.
Author Unknown, "I/PRO and DoubleClick Comprehensive Study Analyzes Ad Banner Impressions; Report Identifies Ad Banner Response Trends," PR Newswire, Oct. 8, 1996, 3 pages.
Author Unknown, "DoubleClick Measures Beyond the Click with New 'Spotlight' Software; First Technology to Track in-Depth Online User Response," PR Newswire, Sep. 4, 1996, 2 pages.
Author Unknown, "New DoubleClick Study Sets Benchmark for Ad Banner Response; Findings Position Internet Advertising as the Standard for Precise, Accountable Media Buying," PR Newswire, Aug. 28, 1996, 2 pages.
Author Unknown, "DoubleClick Network Officially Exceeds 10 Million Users; Clocks One of the Fastest Growth Rates in History of Measured Media; Internet's Premiere Advertising Network Achieves Launch Objectives Six Weeks Ahead of Schedule," PR Newswire, Aug. 1, 1996, 2 pages.
Foster, Ed, "Can mixing cookies' with online marketing be a recipe for heartburn," InfoWorld, Jul. 22, 1996, 3 pages.
Author Unknown, "Kevin Ryan Named CFO of Web Advertising Network, DoubleClick, Inc; Global Executive Joins Tech and Marketing Pioneers on Management Team," PR Newswire, Jul. 9, 1996, 2 pages.
Author Unknown, "Pipeline," InfoWorld, Jul. 8, 1996, 2 pages.
Moran, John M., "Life in Cyberspace / Getting Sold on the Web: A Target Aims at Advertising," Newsday (New York) Jun. 30, 1996, Nassau and Suffolk ed., 2 pages.
Author Unknown, "DoubleClick and I/PRO Form Information Alliance; I/PRO and DoubleClick Partner to Deliver Next Generation in Ad Targeting and Accountability," PR Newswire, Jun. 20, 1996, 3 pages.
Moran, John M., "Cybercommerce; While You Browse, Someone Else on the Web Is Taking Very Careful Aim," Los Angeles Times, Jun. 10, 1996, home ed., 2 pages.
Author Unknown, "DoubleClick Debuts New Tool for Testing Creative on the Web; Service Is First in Web Advertising, Provides Cost-Effective Way to Track Response Rate before Running Ad Schedule," PR Newswire, May 20, 1996, 2 pages.
Bray, Hiawatha, "For advertisers, Web offers wide audience, pinpoint accuracy," The Boston Globe, May 5, 1996, city ed., 2 pages.
Author Unknown, "Poppe Tyson, IAN form Internet Advertising Network; DoubleClick, Poppe Tyson's ad sales subsidiary, and Internet Advertising Network to merge," Information Today, May 1, 1996, 1 page.

Resnick, Rosalind, "xiAdvertisers ready to pour money into sales pitches on the Internet," The Star-Ledger (Newark, N.J.), final ed., Feb. 5, 1996, 2 pages.
Author Unknown, "Poppe Tyson Partners with Atlanta Software Leader to Form DoubleClick—The First Advertising Network for the Internet; Media Planning Is Redefined in a New Era of Online Advertising," PR Newswire, Feb. 5, 1996, 2 pages.
Beatty, Sally Goll, "Poppe Tyson Leads the Charge of Agencies Signing on Internet," Wall Street Journal, Feb. 2, 1996, 1 page.
Resnick, Rosalind, "New Advertising Strategies Emerge on Web," The Miami Herald, Jan. 15, 1996, final ed., 3 pages.
Author Unknown, "Digital's 'Super Spider' Becomes Internet's Fastest-Growing Search Tool; In Less than a Month, Digital Equipment's Hot Technology Surges Past Two Million Hits Daily; Company Considers Licensing, Advertising Offers," PR Newswire, Jan. 11, 1996, 3 pages.
Stanfill et al., "Parallel Free-Text Search on the Connection Machine System," Communications of the ACM, vol. 29, No. 12, Dec. 1986, pp. 1229-1239.
Author Unknown, "NetGravity AdServer Chosen by Internet Shopping Network to Offer Advertisers Reliable, Real-Time Ad Testing," Business Wire, May 30, 1996, 2 pages.
Author Unknown, "Netscape Advertising Management Standardizing on NetGravity AdServer; Netscape selects NetGravity AdServer to manage the site's advertising, further ensuring effectiveness and reliability for Netscape advertisers," Business Wire, Jun. 13, 1996, 2 pages.
Author Unknown, "InterNex and NetGravity Add Online Advertising Management to PowerCommerce Platform; Leading Internet Advertising Management Software Now Available to PowerCommerce Customers," Business Wire, Dec. 3, 1996, 2 pages.
Author Unknown, "NetGravity, Leader in Online Advertising Management Software, Launches Ad Management Solution for Networks; New Component Offers Central Ad Management, Ad Delivery, and Ad Reporting; Efficient, Flexible Advertising Management Across Multiple Web Sites," Business Wire, Jan. 22, 1997, 3 pages.
Manes, Stephen, "Personal Computers; The Demo Is Ready; Is the Product?" The New York Times, Feb. 6, 1996, late ed., final, 2 pages.
Crowe, David, "Web surfers warned about advertising sharks," Australian Financial Review, Dec. 3, 1996, late ed., 2 pages.
Author Unknown, "iVillage and ichat Agree to Build the ChatVillage Network; ChatVillage to Integrate Major Web Sites into User-Friendly Network of Communities," PR Newswire, Dec. 23, 1996, 2 pages.
Author Unknown, "Firefly Network provides open approach for a personalized and measurable web experience," Business Wire, Dec. 3, 1996, 4 pages.
Author Unknown, "Netscape Releases New Versions of Netscape Commercial Applications; More Than 150 Companies Leverage Netscape Publishing System or Netscape Merchant System to Deliver Content and Merchandise to Consumers Online," PR Newswire, Jan. 23, 1997, 2 pages.
Author Unknown, "MapQuest Launches Revolutionary GeoCentric Advertising Program Enabling Businesses to Provide Geographically Sensitive Advertisements as Users Click on Destinations and Content; Online Advertisers Can Extend Narrowcasting with a True Geographic Dimension as Users Interact with MapQuest Maps," PR Newswire, Nov. 4, 1996, 3 pages.
Author Unknown, "ichat Announces Strategic Alliances with I/Pro and NetGravity; Partnerships Between Leaders in Chat, Traffic Measurement, and Banner Serving Confirm Viability of Chat as a Vehicle for Advertising Online," PR Newswire, Nov. 11, 1996, 2 pages.
Author Unknown, "NewsPage gains over 15 new advertisers in last quarter and implements NetGravity's Ad Server; Relevance-based ad placement and substantial growth make NewsPage an increasingly popular Web advertising vehicle," Business Wire, Jul. 31, 1996, 2 pages.
Author Unknown, "Art Technology Group offers competitive upgrade to NetGravity users," Business Wire, Dec. 11, 1996, 2 pages.
Author Unknown, "Quote.com Offers Desired Demographics with Web Advertising Program; Sold-Out Program Launches with 10 Marquee Charter Sponsors," PR Newswire, Jun. 17, 1996, 3 pages.

(56) References Cited

OTHER PUBLICATIONS

Author Unknown, "Dan Lynch and John Kohler Join 4th Network Board of Directors; Internet Pioneers Bring Enhanced Business Development and Market Expertise to 4th Network's Rapidly Growing Technology and Customer Base," Business Wire, Aug. 19, 1996, 2 pages.
Lamonica, Martin, "Mercury tool to test Web site applications," InfoWorld, Jan. 15, 1996, 2 pages.
Kahn, Hal, "Go West. Be Small. Think Big. Bay Area Ad Agencies, Not Madison Avenue, Lead the Way in Creativity," San Jose Mercury News (Calif.), Aug. 25, 1996, correction appended, 5 pages.
Author Unknown, "Sybase Extends Support to Internet Business Partners; Application Solutions Division to Accelerate Delivery of Third-Party Internet Applications," PR Newswire, Apr. 30, 1996, 2 pages.
Author Unknown, "New Netscape Advertising Program Provides Site Sponsors with In-Depth Information and Enhanced Services; Netscape Signs America Online and Softbank Interactive Marketing as Sales Representatives," PR Newswire, Jun. 14, 1996, correction appended, 3 pages.
Dryden, Patrick, "Load-balancing the Web; Router software boosts response, uptime for Web servers," Computerworld, Aug. 26, 1996, 2 pages.
Author Unknown, "'Who's Who List' of Industry Leaders Support Firefly's Standard for Personalization and Community," Business Wire, Feb. 10, 1997, 5 pages.
Author Unknown, "The Chicago Tribune, Bigbook and Ticketmaster to Use I/Pro Audits for Web Ad Sales; I/PRO Celebrates One Year of Delivering Audits to Booming Web Advertising Industry," PR Newswire, Aug. 1, 1996, 2 pages.
Author Unknown, "Barron'S Online Hits Critical Mass with 100,000 Registered Users," Business Wire, Dec. 17, 1996, 2 pages.
Author Unknown, "net.Genesis announces partnership with IBM to provide front end to new Surf-Aid Web site solution," Business Wire, Dec. 11, 1996, 3 pages.
Author Unknown, "The Red Herring, Yahoo! to Host Web Content Companies, Internet Entrepreneurs at Web Market East '96," PR Newswire, Sep. 3, 1996, 2 pages.
Author Unknown, "Lycos Unveils New HotBot Desktop, the First Toolbar to Integrate Desktop Search and Web Search Within the Browser; First Product Allowing Users to Search e-Mail, PC Files, the Web and More, for Free and without Registration," PR Newswire, Mar. 22, 2004, 2 pages.
Hicks, Matt, "HotBot Pushes Toolbar with Local-File Search; The search site launches a search toolbar that lets users find files and e-mails on their hard drives and aggregate RSS feeds from the Web," eWeek, Mar. 22, 2004, 2 pages.
Bazeley, Michael, "Search Toolbars from Hotbot, Dogpile Make Their Debut," San Jose Mercury News (Calif.), Mar. 22, 2004, morning final ed., 2 pages.
Gunn, Holly, "Searching with the new HotBot; Searching the Web," Teacher Librarian, Dec. 1, 2003, 2 pages.
Author Unknown, "Lycos Announces Winners of Hack HotBot Contest; John Lione, Age 39, from Sudbury, Mass., Grand-Prize Winner with Tiki Beach Skin Entry," PR Newswire, Jun. 30, 2003, 2 pages.
Author Unknown, "Lycos Heats up HotBot with the Launch of HotBot's Quick-Search Deskbar," PR Newswire, Jun. 24, 2003, 2 pages.
Weaver, Belinda, "Totally hot HotBot," Courier Mail (Queensland, Australia), Mar. 22, 2003, 2 pages.
Schorow, Stephanie, "Start your engines; The race is on for competitors to win online search battle," The Boston Herald, Mar. 11, 2003, 2 pages.
Johnson, Michelle, "Retooled Hotbot Back for Another Round," The Boston Globe, Feb. 3, 2003, 3rd ed., correction appended, 2 pages.
Pruitt, Scarlet, "HotBot revs up with four search engines," InfoWorld Daily News, Dec. 16, 2002, 2 pages.
Author Unknown, "Inktomi Expands Web Search Services on HotBot; Terra Lycos Selects Inktomi as Preferred Search Provider for New HotBot Site," Business Wire, Dec. 16, 2002, 2 pages.
CNET news.com, "Terra Lycos relaunches HotBot," globeandmail. com, Dec. 16, 2002, 1 page.
Rountree, Kristen, "Hill, Holliday Fashions Relaunch Ads for HotBot," ADWEEK, Dec. 16, 2002, 2 pages.
Author Unknown, "HotBot aims first UK campaign at students," New Media Age, May 17, 2001, 2 pages.
Author Unknown, "Lycos Europe Network Selects Inktomi Search Solutions for New HotBot Europe Search Engine Site; Inktomi Search/Web and Search/Media to Provide a More Compelling and Rich Internet Experience to European Internet Users," Business Wire, Nov. 13, 2000, 3 pages.
Author Unknown, "Lycos, Inc.'s HotBot Named Favorite Search Engine in 'Wall Street Journal' Survey," Business Wire, Dec. 8, 1999, 2 pages.
Author Unknown, "Lycos, Inc.'s HotBot Recognized as Best Search Engine for the Year—'PC Computing' and 'U.S. News & World Report' Further Establish Lycos Network Leadership on the Web," Business Wire, Nov. 16, 1999, 2 pages.
Author Unknown, "Lycos Inc.'s HotBot Honors Nobel Laureates with Release of Web's Most Popular 20th Century Peace Prize Winners," PR Newswire, Oct. 14, 1999, 2 pages.
Author Unknown, "Lycos, Inc.'s Hotbot Integrates LexiQuest's Technology, Enabling Advertisers to More Efficiently Purchase and Target Ads," Business Wire, Sep. 21, 1999, 2 pages.
Author Unknown, "TRIP.com Becomes a Premier Travel Provider of Lycos, Inc.'s HotBot Search Site; TRIP.com Helps Millions of HotBot Users Locate Timely, Relevant Travel Information," Business Wire, Sep. 16, 1999, 2 pages.
Author Unknown, "Top Tech Publication Selects Lycos, Inc.'s HotBot as 'Best All-Purpose Search Engine' in 1999 Editor's Choice Awards," PR Newswire, Sep. 15, 1999, 2 pages.
Author Unknown, "Lycos, Inc.'s HotBot Earns Highest Scores in Search Engine Test by Leading Web Industry Publication Based on Search Excellence; 'HotBot Got Perfect Scores for Delivering Users to Official Company Sites in the Test'—'Search Engine Watch,'" PR Newswire, Sep. 9, 1999, 2 pages.
Author Unknown, "Listen.com Signs Music Syndication Deal with Lycos, Inc.'s HotBot; Offers Comprehensive Music Download Directory to Millions of Web Searchers," Business Wire, Aug. 23, 1999, 2 pages.
Author Unknown, "Lycos Inc.'s HotBot Reveals Web's Most Popular University Picks; 'US News & World Report's' Best Colleges List Ranked by HotBot's Millions of Monthly Web Searchers," Business Wire, Aug. 20, 1999, 2 pages.
Author Unknown, "Lycos Inc.'s HotBot Wins Editor's Choice Award from Popular European Technology Magazine Based on Search Excellence," PR Newswire, Aug. 6, 1999, 2 pages.
Smith, Catherine Arnott, "HealthGate: Too good to be true???" hhtps://groups.google.com/forum/, 1 page.
Healthgate Data Corp., Amendment No. 9 to Form S-1, filed Dec. 29, 1999, with the Securities and Exchange Commission, Registration No. 333-76899, 163 pages.
Author Unknown, "HealthGate Data unveils HealthGate, the first World Wide Web medical information system for consumers; World Wide Web users can research medical diagnoses, illnesses, and treatments—http://www.healthgate.com," Business Wire, Jan. 22, 1996, 4 pages.
Author Unknown, "Sponsorship Opportunities," HealthGate, https://web.archive.org/web/19961105192255/http://www.healthgate.com/HealthGate/product/sponsorships.html, 1 page.
Smith, Catherine Arnott, "HealthgateNendor 'advertising,'" Mar. 12, 1996, https://groups.google.com/forum/, 1 page.
Gudivada et al., "Information Retrieval," IEEE Internet Computing, Sep.-Oct. 1997, pp. 58-68.
Buckley, Chris, "Implementation of the SMART Information Retrieval System," Cornell University, May 1985, 40 pages.
Morita et al., "Information Filtering Based on User Behavior Analysis and Best Match Text Retrieval," SIGIR '94 Proceedings of the 17th Annual International ACM SIGIR Conference on Research and Development in Information Retrieval, New York: Springer-Verlag, 1994, pp. 272-281.

(56) References Cited

OTHER PUBLICATIONS

Tan et al., "Learning User Profiles for Personalized Information Dissemination," Proceedings of the 1998 IEEE International Joint Conference on Neural Networks, 1998, pp. 183-188.
Lieberman, Henry, "Letizia: An Agent That Assists Web Browsing," Media Laboratory, Massachusetts Institute of Technology, http://web.media.mit.edu/~lieber/Lieberary/Letizia/Letizia-AAAI/Letizia.html, 9 pages.
Mooney, Gary, "Intelligent Information Retrieval from the World Wide Web Using Fuzzy User Modelling," Library and Information Research News, vol. 21, No. 67, Winter 1996, pp. 24-28.
Bloedorn et al, "Machine Learning of User Profiles: Representational Issues," Proceedings of AAAI-96, Portland, OR, Aug. 4-8, 1996, pp. 433-438.
Rayward-Smith et al. (eds.), "Modern Heuristic Search Methods," Chichester, England: John Wiley and Sons, 1996, 292 pages.
NetGravity, "NetGravity AdServer Help," 73 pages.
Knoblock, Craig A., "Searching the World Wide Web," IEEE Expert, Jan.-Feb. 1997, pp. 8-14.
Author Unknown, "Short History of Early Search Engines," http://www.thehistoryofseo.com/The-Industry/Short_History_of_Early_Search_Engines.aspx, 5 pages.
Pazzani et al., "Syskill & Webert: Identifying Interesting Web Sites," AAAI'96 Proceedings of the Thirteenth National Conference on Artificial Intelligence, vol. 1, 1996, pp. 54-61.
Lager, Mark, "Spinning a Web Search," http://misc.library.ucsb.edu/untangle/lager.html, 10 pages.
Fain et al., "Sponsored Search: A Brief History," Bulletin of the American Society of Information Science and Technology, Dec./Jan. 2006, pp. 12-13.
Flynn, Laurie J., "Start-Ups Plot to Make the Web Comfortable for Advertisers," CyberTimes, The New York Times, Feb. 13, 1996, 3 pages.
Author Unknown, "For More About Tide, Click Here," Businessweek, Jun. 2, 1996, 2 pages.
Larsen et al., "The Use of Fuzzy Relational Thesauri for Classificatory Problem Solving in Information Retrieval and Expert Systems," IEEE Transactions on Systems, Man, and Cybernetics, vol. 23, No. 1, Jan./Feb. 1993, pp. 31-41.
Author Unknown, "Ultramatch Behavioral Targeting," InfoSeek, http://info.infoseek.com/doc/ultramatch/Applications_of_Behavioral_Targeting_Ad, 6 pages.
Author Unknown, "What Hath Yahoo Wrought?" Businessweek, Feb. 11, 1996, 3 pages.
Hill, Brad, "World Wide Web Searching for Dummies," Foster City, CA: IDS Books, 1996, 382 pages.
Sullivan, Danny, "Where Are They Now? Search Engines We've Known & Loved," Search Engine Watch, http://searchenginewatch.com/article/2064954/Where-Are-they-Now-Search-Engines-Weve-Known-And-Loved.
Notice of Allowance for U.S. Appl. No. 13/724,147, mailed Sep. 26, 2013, 10 pages.
Final Office Action for U.S. Appl. No. 13/723,642, mailed Oct. 9, 2013, 19 pages.
Final Office Action for U.S. Appl. No. 13/723,670, mailed Oct. 9, 2013, 14 pages.
Final Office Action for U.S. Appl. No. 13/724,495, mailed Oct. 15, 2013, 14 pages.
Final Office Action for U.S. Appl. No. 13/724,369, mailed Oct. 29, 2013, 17 pages.
Final Office Action for U.S. Appl. No. 13/724,076, mailed Oct. 22, 2013, 16 pages.
Fukushima, S. et al., "Improved Retrieval in a Fuzzy Database from Adjusted User Input," Journal of Intelligent Information Systems, Copyright: 1995, 26 pages.
Kamba, Tomonari et al., "The Krakatoa Chronicle—An Interactive, Personalized, Newspaper on the Web," W3.org, Nov. 11, 2013, 12 pages, www.w3.org/Conferences/WWW4/Papers/93/.
Author Unknown, "Study: Search Engine Vendors Adopt New Strategies"(1996). Phillips Business Information's Internet Week, 1. Retrieved from http://search.proquest.com/docview/206160837?accountid=142944, 3 pages.
Shardanand et al., "Social Information Filtering: Algorithms for Automating 'Word of Mouth,'" CHI '95 Proceedings of the SIGCHI Conference on Human Factors in Computing Systems, New York: ACM Press/Addison-Wesley, 1995, pp. 210-217.
Author Unknown, "Aptex Announces SelectCast 'Turbocharger' for Advertising Servers," Business Wire, Dec. 3, 1996, 2 pages.
Submit It! "The Submit It! Advantage," 1996, http://submit-it.com/subadv.htm, 2 pages.
Submit It! "Submit It! Directory and Search Engine List," n.d., http://submit-it.com/subcats.htm, 8 pages.
Submit It! "How Submit It! Works," 1996, http://submit-it.com/subease.htm, 2 pages.
Submit It! "Submit It! Overview," 1996, http://submit-it.com, 1 page.
Submit It! "Submit It! Services Summary," 1996, http://submit-it.com/subsrv.htm, 2 pages.
Submit It! "Submit It! Test Drive: Non-Frames Version," 1996, http://submit-it.com/subtest.htm, 1 page.
Submit It! "Tips for Registering Your URL to Search Engines and Directories," 1996, http://submit-it.com/subopt.htm, 6 pages.
Submit It! "User Guide," Gold and Pro Version, Dec. 15, 1996, 16 pages.
Submit It! "Submit It! User Guide," 1996, http://submit-it.com/subman.htm, 1 page.
Williamson et al., "The Dynamic HomeFinder: Evaluating Dynamic Queries in a Real-Estate Information Exploration System," SIGIR '92 Proceedings of the 15th Annual International ACM SIGIR Conference on Research and Development in Information Retrieval, New York: ACM, 1992, pp. 338-346.
Subtil et al., "A Fuzzy Information Retrieval and Management System and Its Applications," SAC '96 Proceedings of the 1996 ACM Symposium on Applied Computing, New York: ACM, 1996, pp. 537-541.
Wiederhold, Gio, "Digital Libraries, Value, and Productivity," Communications of the ACM, vol. 38, No. 4, Apr. 1995, pp. 85-96.
Wong et al., "On Modeling Information Retrieval with Probabilistic Inference," ACM Transactions on Information Systems, vol. 13, No. 1, Jan. 1995, pp. 38-68.
Wilms, C. Jan, "A Natural Language Interface for an Intelligent Document Information and Retrieval System," thesis, University of Mississippi, May 1988, 57 pages.
Turpeinen et al., "Architecture for Agent-Mediated Personalised News Service," Department of Computer Science, Helsinki University of Technology, 1996, 14 pages.
Thompson, Roger Howard, "The Design and Implementation of an Intelligent Interface for Information Retrieval," Ph.D. thesis, University of Massachusetts at Amherst, Feb. 1989, 228 pages.
Author Unknown, "The CyberGold Service," 8 pages.
Yager et al. (eds.), "An Introduction to Fuzzy Logic Applications in Intelligent Systems," Boston: Kluwer Academic, 1992, 187 pages.
Woelk et al., "The InfoSleuth Project: Intelligent Search Management via Semantic Agents," Proceedings of the Second International World Wide Web Conference, Oct. 1994, 9 pages.
Yu et al., "An Approach to Probabilistic Retrieval," SIGIR '81 Proceedings of the 4th Annual International ACM SIGIR Conference on Information Storage and Retrieval: Theoretical Issues in Information Retrieval, New York: ACM, 1981, pp. 46-55.
Author Unknown, "A Brief History of NetGravity," Mar. 9, 2001, http://www.basswood.com/ts/briefhist.html, 2 pages.
Resnick et al., "GroupLens: An Open Architechture for Collaborative Filtering of Netnews," Proceedings of ACM 1994 Conference on Computer Supported Cooperative Work, Chapel Hill, NC, pp. 175-186.
NetGravity, Inc., "About NetGravity AdServer," 1996, including AdMaster's Guide, Administrator's Guide, and Programmer's Guide, 203 pages.
NetGravity, "AdServer 2.0," 1996, http://www3.netgravity.com/products/, 2 pages.
NetGravity, "Ad Reporting," 1996, http://www3.netgravity.com/products/reporting.html, 2 pages.

(56) References Cited

OTHER PUBLICATIONS

Maes, Pattie, "Agents That Reduce Work and Information Overload," Communications of the ACM, vol. 37, No. 7, Jul. 1994, pp. 31-40, 146.

Balabanović, Marko, "An Adaptive Web Page Recommendation Service," Proceedings of the First International Conference on Autonomous Agents Agents '97, New York, ACM Press, 1997, pp. 378-385.

Höfferer et al., "An Evolutionary Approach to Intelligent Information Filtering," 2nd Singapore International Conference on Intelligent Systems, Nov. 1994, 6 pages.

O'Riordan et al., "An Intelligent Agent for High-Precision Text Filtering," CIKM '95, Proceedings of the 1995 International Conference on Information and Knowledge Management, Nov. 28-Dec. 2, 1995, Baltimore, MD, pp. 205-211.

Quint, Barbara, "An Internet 'Vitual Library' Builder: Steve Kirsch, president, CEO, InfoSeek Corporation," Business & Company Resource Center, vol. 3, No. 7, Jul.-Aug. 1995, 6 pages.

Hall et al., "An Introduction to Multisensor Data Fusion," Proceedings of the IEEE, vol. 85, No. 1, Jan. 1997, pp. 6-23.

Business Editors, "Bellcore Adapt X Advertiser: New Software Solution for the Web Delivers Profitable, Measurable, Truly Interactive Advertising," Business Wire, Jun. 11, 1996, 2 pages.

Author Unknown, "Bellcore Deploys Adaptive Web Software," Telecommunications Alert, vol. 13, No. 127, Jul. 1, 1996, 1 page.

Author Unknown, "Bellcore Launches Adapt/X Advertiser 2.0; New Features Improve Ad Campaign Management, Inventory Control and Real-Time Reporting," Business Wire, May 20, 1997, 3 pages.

Author Unknown, "Shadow Advertising," The Boston Globe, Nov. 14, 1996, 2 pages.

Lam et al., "Detection of Shifts in User Interests for Personalized Information Filtering," Proceedings of the 19th Annual International ACM SIGIR Conference on Research and Development in Information Retrieval, 1996, pp. 317-325.

CNET news.com, "Engine Sells Results, Draws Fire," CNET News, Jun. 21, 1995, 3 pages.

Sheth et al., "Evolving Agents for Personalized Information Filtering," Proceedings of the Ninth Conference on Artificial Intelligence for Applications, 1993, pp. 345-352.

Edwards et al., "Experience with Learning Agents Which Manage Internet-Based Information," AAAI Technical Report SS-96-05, 1996, pp. 31-40.

Pinkerton, Brian, "Finding What People Want: Experiences with the WebCrawler," Second International WWW Conference, 1994, 10 pages.

Author Unknown, "Firefly Licenses Targeting Technology," Advertising Age, http://adage.com/article/news/firefly-licenses-targeting-technology/75969/, 1 page.

Author Unknown, "Firefly Network and Yahoo! Offer Consumers Ability to Intelligently Navigate the Web," Dec. 11, 1996, 3 pages.

Bosc et al. "Fuzzy Querying in Conventional Databases." Ed. Zadeh et al. Fuzzy Logic for the Management of Uncertainty. New York: John Wiley & Sons, 1992, pp. 645-671.

Kosko et al., "Fuzzy Logic: The binary logic of modern computers often falls short when describing the vaguenes of the real world. Fuzzy logic offers more graceful alternatives," Scientific American, Jul. 1993, pp. 76-81.

Singh et al., "Fuzzy Pattern Recognition for Knowledge-Based Systems," published as "Fuzzy Search Techniques in Knowledge-Based Systems," Proceedings of the 6th International Conference on Data and Knowledge Systems for Manufacturing and Engineering (DKSME'96), Tempe, AZ, Oct. 24-25, 1996, pp. 1-10.

Radecki, Tadeusz, "Fuzzy Set Theoretical Approach to Document Retrieval," Information Processing & Management, vol. 15, 1979, pp. 247-259.

Author Unknown, "Dow Jones Indexes Now Available Through Most Popular Chinese Web Site—SINANET.com; Financial Index to Be Listed in Chinese for the First Time," Business Wire, Jun. 4, 1998, 3 pages.

Non-final Office Action for U.S. Appl. No. 13/723,642 mailed May 27, 2014, 20 pages.

Non-final Office Action for U.S. Appl. No. 13/723,670 mailed May 12, 2014, 17 pages.

Non-final Office Action for U.S. Appl. No. 13/724,495 mailed May 30, 2014, 15 pages.

Non-final Office Action for U.S. Appl. No. 13/724,369 mailed May 23, 2014, 17 pages.

Non-final Office Action for U.S. Appl. No. 13/724,076 mailed May 9, 2014, 7 pages.

Notice of Allowance for U.S. Appl. No. 13/724,076, mailed Jun. 6, 2014, 7 pages.

Adam et al., "Strategic Directions in Electronic Commerce and Digital Libraries: Towards a Digital Agora," ACM Computing Surveys, vol. 28, No. 4, Dec. 1996, pp. 818-835, Oct. 23, 1996.

Aptex, "Aptex is hiring!" http://web.archive.org/web/19961023020624fw_/http://www.aptex.com/aptxhome.htm, 1 page, Oct. 23, 1996.

Aptex, "SelectCastTM," http://web.archive.org/web/19961023021236fw_/http://www.aptex.com/select2.htm, 1 page Nov. 12, 1996.

NetGravity Adserver, "Advertiser Report for All Advertisers," https://web.archive.org/web/19961112043630/http://www3.netgravity.com, 3 pages.

Bordogna et al., "Fuzzy Inclusion in Database and Information Retrieval Query Interpretation," Proceedings of the 1996 ACM Symposium on Applied Computing (SAC), Feb. 17-19, 1996, Philadelphia, PA, pp. 547-551.

Balachandra R., "A Simulation Model for Predicting the Effect of Advertisement Schedules," Winter Simulation Conference, Dec. 5-7, 1977, pp. 580-589.

Belkin et al., "Distributed Expert-Based Information Systems: An Interdisciplinary Approach," Information Processing & Management, vol. 23, No. 5, 1987, pp. 395-409.

Baklarz, George, "Using Neural Nets to Optimize Retrieval in a Fuzzy Relational Database," CASCON '92 Proceedings of the 1992 conference of the Centre for Advanced Studies on Collaborative Research, vol. 1, 1992, pp. 191-200.

Dedrick, Rick, "A Consumption Model for Targeted Electronic Advertising," IEEE Multimedia, Summer 1995, pp. 41-49.

Author Unknown, "Alpha Base Interactive Provides Hyper-Targeted Marketing Services," PR Newswire Association, Inc., Dec. 4, 1996, 2 pages.

Burkowski et al., "Delivery of Electronic News: A Broadband Application," Proceedings of the 1994 Conference of the Centre for Advanced Studies on Collaborative Research, Oct. 31-Nov. 3, 1994, Toronto, Ontario, Canada, pp. 1-5.

Author Unknown, "Personalized Marketing and Selling on the Internet Unleased by BroadVision: One-to-One Application System Helps Marketers Build Long-Term Relationships through Personalized Content, Services and Promotions," Business Wire, Jan. 22, 1996, 3 pages.

Buell et al., "Performance Measurement in a Fuzzy Retrieval Environment," SIGIR '81 Proceedings of the 4th Annual International ACM SIGIR Conference on Information Storage and Retrieval: Theoretical Issues in Information Retrieval, 1981, pp. 56-62.

Boyan et al., "A Machine Learning Architecture for Optimizing Web Search Engines," AAAI Workshop on Internet-Based Information Systems, Portland, Oregon, 1996, 8 pages.

Author Unknown, "BroadVision Developing First Interactive Commerce Management System to Support Online Sales & Marketing Process: New Software Category Necessary to Interactive Network Architecture," Business Wire, May 15, 1995, 3 pages.

Brueni et al., "What If There Were Desktop Access to the Computer Science Literature?" CSC '93 Proceedings of the 1993 ACM Conference on Computer Science, pp. 15-22.

Author Unknown, "BroadVision Uses Its On-line Marketing Database to Deliver Personalised World Wide Web Sites," Computergram International, Mar. 21, 1996, 3 pages.

Partovi, Ali, "Bubble Blinders: The Untold Story of the Search Business Model," Aug. 29, 2010, TechCrunch.com, http://techcrunch.com/2010/08/29/bubble-blinders-the-untold-story-of-the-search-business-model.htm, 8 pages.

(56) References Cited

OTHER PUBLICATIONS

Author Unknown, "Lycos signs key advertisers for popular Internet catalog; Microsoft, AT&T and NECX charter sponsors on leading Web Index," Business Wire, Sep. 18, 1995, 2 pages.
Dedrick, Rick, "Interactive Electronic Advertising," Proceedings of the 1st International Workshop on Community Networking Integrated Multimedia Services to the Home, 1994, pp. 55-66.
Author Unknown, "C/NET Introduces Customized Web Advertising: Display Banners Tailored to User Demographics," Internet Week, Dec. 18, 1995, 1 page.
Damiani et al., "Automatic Thesaurus Construction Supporting Fuzzy Retrieval of Reusable Components," SAC '95 Proceedings of the 1995 ACM Symposium on Applied Computing, 1995, pp. 542-547.
Foltz et al., "Personalized Information Delivery: An Analysis of Information Filtering Methods," Communications of the ACM, vol. 35, No. 12, Dec. 1992, pp. 51-60.
Carroll et al., "Developing the Blacksburg Electronic Village," Communications of the ACM, vol. 39, No. 12, Dec. 1996, pp. 69-74.
Dologite et al., "Developing a Knowledge-Based System for Product Position Advertising Strategy Formulation," IEEE International Conference on Developing and Managing Intelligent System Projects, Mar. 29-31, 1993, pp. 190-197.
Thompson et al., "Support for browsing an intelligent text retrieval system," International Journal of Man-Machine Studies, vol. 30, No. 6, Jun. 1989, pp. 639-668.
Author Unknown, "Study evaluates online services for business intelligence," Online Product News, vol. 19, No. 1, 2000, 2 pages.
Author Unknown, "Value-added online information services cost-effective sources," Worldwide Databases, vol. 11, No. 12, Dec. 1999, 2 pages.
Author Unknown, "Value-Added Online Information Services Found to Be Most Thorough and Cost-Effective Information Sources on the World Wide Web," Business Wire, Oct. 26, 1999, 2 pages.
Author Unknown, "dowjones.com Unveils Weekly Industry-By-Industry News Archives," Business Wire, Oct. 25, 1999, 2 pages.
Author Unknown, "Dow Jones & Co.," ASAP and Axon Group Risk & Insurance, Oct. 15, 1999, 1 page.
Author Unknown, "dowjones.com to Give Readers a Glimpse Into the 21st Century; Online Participation Invited at The Wall Street Journal Millennium Forum," Business Wire, Oct. 11, 1999, 2 pages.
Author Unknown, "Dow Jones & Company Acquires Minority Stake in CareerCast, Software Developer for Internet Jobs Sites," Business Wire, Sep. 8, 1999, 2 pages.
Author Unknown, "Dow Jones Launches dowjones.com, a Free Vertical Portal Site for Business-oriented Web Users." Business Wire, Jun. 2, 1999, 3 pages.
Quint, Barbara, "DJI Offers Competitive Intelligence Resources, Free Portal Service for Web Users; Dow Jones Interactive Publishing," Information Today, vol. 16, No. 6, Jun. 1, 1999, 3 pages.
O'Leary, Mick, "Web Center Tames the Web," Information Today, vol. 16, No. 1, Jan. 1, 1999, 4 pages.
Author Unknown, "NewsEdge Integrates Access to Dow Jones Interactive's Publications Library into Netscape Business Journal; NewsEdge Expands Content and Features Available to Netscape Netcenter Visitors," PR Newswire, Dec. 17, 1998, 3 pages.
Author Unknown, "CNBC/Dow Jones Business Video to be Offered through IFN's InfoGate(TM) Platform," PR Newswire, Nov. 9, 1998, 2 pages.
Author Unknown, "DJI Adds AP Newswire, Launches Web Center; Dow Jones & Co enters into agreement with Associated Press," Information Today, vol. 15, No. 10, Nov. 1, 1998, 3 pages.
Author Unknown, "Dow Jones Interactive Expands Searching Capability to World Wide Web Content," Business Wire, Oct. 14, 1998, 3 pages.
Author Unknown, "Wired's HotBot Search Center Adds Web's Largest Topical Directory to Enhance Web Navigation; Category-focused Directory Provides New Opportunities for Targeted Advertising," Business Wire, Feb. 9, 1998, 3 pages.
Author Unknown, "CNET Names Wired's HotBot Best Internet Search Engine," PR Newswire, Jan. 16, 1998, 2 pages.
Author Unknown, "Wired Digital's HotBot Search Site Unveils Largest Web Index; 110 Million Page Database Extends and Enhances Web Power Searching," PR Newswire, Dec. 10, 1997, 2 pages.
Author Unknown, "Wired Digital's HotBot Search Engine Wins Top Honors from PC Magazine and PC Computing," Business Wire, Nov. 17, 1997, 2 pages.
Author Unknown, "Wired Digital Unveils HotBot 4.0, the Wired Search Center, with Enhanced Search Services and Smarter 'SuperSearch' Interface for Serious Web Searches," Business Wire, Sep. 29, 1997, 3 pages.
Author Unknown, "Wired's HotBot Now Ranked No. 1 Search Engine by Three Leading Consumer Technology Publications; PC Computing, Internet World, and Computer Life Give HotBot Highest Rating among Search Engines," Business Wire, Sep. 8, 1997, 2 pages.
Author Unknown, "Wired's HotBot Partners with Bell Atlantic's BigYellow; HotBot, the Web's Top-Rated Search Engine, Adds Comprehensive Directories for Businesses, Residences and Email Addresses," Business Wire, Aug. 19, 1997, 2 pages.
Author Unknown, "HotBot introduces Inktomi's SmartCrawl; The largest search engine on the Web is now also the freshest search engine on the Web," Business Wire, May 15, 1997, 2 pages.
Author Unknown, "HotBot trounces competitors in PC Computing's Search Engine Challenge; HotBot outperformed AltaVista and other leading engines in grueling 2-day test; Wired's HotBot emerging as the new standard for business computer users," Business Wire, May 8, 1997, 2 pages.
Author Unknown, "HotBot Joins New Netscape Search Program; Wired teams with Netscape to highlight HotBot on Netscape Search page," Business Wire, Apr. 7, 1997, 2 pages.
Author Unknown, "HotBot Teams up with BellSouth; Popular search engine signs first agreement in new ISP program," Business Wire, Aug. 27, 1996, 2 pages.
Author Unknown, "The 'Hottest' Search Engine," dot.com, Jun. 1996, 2 pages.
Author Unknown, "Another Search Engine? Hotwired Introduces HotBot, Powered by Inktomi; HotBot First Search Engine to Index Every Word on World Wide Web; Inktomi Technology Provides the Most Relevant Results," PR Newswire, May 20, 1996, 3 pages.
NetGravity, "NetGravity Teams with CyberCash to Advance Business Opportunities on the Internet," Apr. 3, 1996, http://www3.netgravity.com/news/pressrel/cybercash.html, 2 pages.
NetGravity, "NetGravity Leads Internet Ad Industry with Support of Macromedia Shockwave, Lending Powerful Impact to Online Advertising," Sep. 4, 1996, http://www3.netgravity.com/news/pressrel/macromedia.html, 2 pages.
NetGravity, "NetGravity Announces AdServer 2.0, Raises the Standard in Online Advertising Management Software," Oct. 14, 1996, http://www3.netgravity.com/news/pressrel/as20launch.html, 1 page.
NetGravity, "NetGravity Launches AdServer, the Premier Advertising Management System Software for World Wide Web Publishers," Jan. 31, 1996, http://www3.netgravity.com/news/pressrel/launch.html, 1 page.
NetGravity, "NetGravity AdServer Chosen by Internet Shopping Network to Offer Advertisers Reliable, Real-Time Ad Testing," May 30, 1996, http://www3.netgravity.com/news/pressrel/isn.html, 2 pages.
NetGravity, "NetGravity and I/PRO Form Strategic Alliance, Setting Standard for Internet Advertising Management and Measurement," Jun. 17, 1996, http://www3.netgravity.com/news/pressrel/irpo.html, 1 page.
NetGravity, "NetGravity AdServer Delivers Over One Billion Ads on the Most Volume- and Content-Intensive Sites on Web," Nov. 5, 1996, http://www3.netgravity.com/news/pressrel/billion.html, 1 page.
NetGravity, "NetGravity Partners with Open Market for Internet Advertising and Commerce Solutions," May 2, 1996, http://www3.netgravity.com/news/pressrel/openmarket.html, 2 pages.
NetGravity, "NetGravity Frequently Asked Questions," Nov. 7, 1996, http://www3.netgravity.com/support/faq.html, 1 page.

(56) References Cited

OTHER PUBLICATIONS

NetGravity, "NetGravity AdServer Chosen by GNN to Standardize WebCrawler Advertising Management," Jun. 17, 1996, http://www3.netgravity.com/news/pressrel/gnn.html, 2 pages.
O'Reilly, Tim, "Publishing Models for Internet Commerce," Communications of the ACM, vol. 39, No. 6, Jun. 1996, pp. 79-86.
Pitkow et al., "Emerging Trends in the www User Population," Communications of the ACM, vol. 39, No. 6, Jun. 1996, pp. 106-108.
Author Unknown, "Poppe Tyson Partners with Atlanta Software Leader to Form DoubleClick—The First Advertising Network for the Internet," PR Newswire, Feb. 5, 1996, 2 pages.
Pitkow et al., "WebViz: A Tool for the World-Wide Web Access Log Analysis," Proceedings of the First International World-Wide Web Conference, 1994, 7 pages.
NetGravity, "Pathfinder Web Site Installs NetGravity AdServer," Feb. 29, 1996, http://www3.netgravity.com/ news/pressrel/pathfinder.html, 1 page.
NetGravity, "Netscape Advertising Management Standardizing on NetGravity AdServer," Jun. 13, 1996, http://www3.netgravity.com/news/pressrel/netscape.html, 2 pages.
Schoenly et al., "Intelligent Document Information Retrieval System for Determinants of Medication Research Literature Collection," CSC '88 Proceedings of the 1988 ACM Sixteenth Annual Conference on Computer Science, New York: ACM, 1988, p. 700.
Pyle, Raymond, "Electronic Commerce and the Internet," Communications of the ACM, vol. 39, No. 6, Jun. 1996, pp. 22-23.
Hill, et al., "Recommending and Evaluating Choices in a Virtual Community of Use," 1995, http://www.sigchi.org/chi95/proceedings/papers/wch_bdy.htm, 13 pages.
Wiskirchen, Bradley J., for Holland & Hart, "Barring ex-employee competition without a non-compete provision," Idaho Employment Law Letter, Jan. 1998, 2 pages.
Author Unknown, "Is Advertising Supposed to Be Web's Cash Cow?" dot.com, Jan. 1998, 1 page.
Author Unknown, "DoubleClick's DART Hits the Mark; New Clients and Staff Hires Support Ad Serving Business," PR Newswire, Dec. 30, 1997, 2 pages.
Author Unknown, "New sponsors for NMA Award," New Media Age, Dec. 18, 1997, 1 page.
Weber, Thomas E., "Advertising: Red Flags from Leading Web-Ad Seller," Wall Street Journal, Dec. 18, 1997, 1 page.
Huhn, Mary, "DoubleClick Hopes to Click with $32.2M IPO," The New York Post, Dec. 17, 1997, 2 pages.
Author Unknown, "Ad Notes," Wall Street Journal, Dec. 17, 1997, 1 page.
Author Unknown, "DoubleClick Inc. Files Registration Statement for Initial Public Offering," PR Newswire, Dec. 16, 1997, 2 pages.
McMorris, Frances A., "Legal Beat: Judge Restricts Two Executives Despite Lack of Noncompete Pacts," Wall Street Journal, Nov. 25, 1997, 1 page.
Connors, Emma, "Enter the Heavyweights of Net Advertising," Australian Financial Review, Nov. 24, 1997, late ed., 2 pages.
Author Unknown, "New Media: Surfer, Identify Yourself," Strategy, Nov. 10, 1997, 1 page.
Wright, Charles, "Lines drawn in the battle for advertising," Australian Financial Review, Nov. 7, 1997, late ed., 2 pages.
Author Unknown, "Net Shepherd Inks Advertising Representation Agreement with DoubleClick," Business Wire, Nov. 4, 1997, 2 pages.
Lang, Amanda, "Cyberspace advertising soars: Technology that tailors message for target users lures advertisers," The Financial Post, Nov. 4, 1997, 3 pages.
Author Unknown, "LookSmart(SM) Chooses DoubleClick Network as Advertising Sales Partner," PR Newswire, Oct. 30, 1997, 2 pages.
Author Unknown, "I/PRO Customer Base Continues to Grow; Prodigy, FOX and ABC Top the List of Over 30 New Sites That Have Signed on for I/PRO Auditing and Measurement Services in the Third Quarter of '97," PR Newswire, Oct. 6, 1997, 2 pages.
Author Unknown, "The Cookie Crumbles," Marketing Tools, Oct. 1997, 2 pages.
Steinberg, Steve G., "Trying to Make a Connection," Los Angeles Times, Sep. 29, 1997, 3 pages.
Aptex, "Aptex is hiring!" http://web.archive.org/web/19961023020624fw_/http://www.aptex.com/aptxhome.htm, from 1996, 1 page.
Aptex, "SelectCastTM," http://web.archive.org/web/19961023021236fw_/http://www.aptex.com/select2.htm, from 1996, 1 page.
Netgravity Adserver, "Advertiser Report for All Advertisers," https://web.archive.org/web/19961112043630/http://www3.netgravity.com, from 1996, 3 pages.
Croft et al, "I3R: A New Approach to the Design of Document Retrieval Systems," Journal of the American Society for Information Science, vol. 38, No. 6, 1987, pp. 389-404.
O'Dwyer, Jack, "Dow Jones Unites Newswires into One Service," Jack O'Dwyer's Newsletter, vol. 23, No. 38, Sep. 26, 1990, 1 page.
Fox et al. "Integrating Search and Retrieval with Hypertext." Hypertext/Hypermedia Handbook. Ed. Berk, Emily, et al. New York: Intertext/McGraw-Hill, 1991, pp. 329-355.
Author Unknown, "Hyper System," Hyper Net, Tokyo, Japan, 1996, 3 pages.
Kraft, Donald H., "Research into Fuzzy Extensions of Information Retrieval," SIGIR Forum, vol. 20, No. 1-4, 1986, pp. 12-13.
Larsen, H. L., et al. "Query Fuzzification for Internet Information Retrieval." Fuzzy Information Engineering: A Guided Tour of Applications. Ed. Dubois, D., et al. New York: John Wiley, 1996, pp. 291-310.
Author Unknown, "About I/PRO," http://www.ipro.com, May 8, 1996, 19 pages (URL no longer available).
Kraft, Donald H., "Advances in Information Retrieval," ACM '82, Proceedings of the ACM '82 Conference, 1985, pp. 186-187.
Submit IT! "Submit It! Directory and Search Engine List," http://submit-it.com/subcats.htm, from 1996, 8 pages.
Author Unknown, "The CyberGold Service," from 1996, 8 pages.
Shoval et al., "ERSE: An Expert Retrieval System for Electronic Databases," Expert Systems for Information Management, vol. 3, No. 2, 1990, 85-114.
Williamson, Debra Aho, "Firefly Licenses Targeting Technology," Advertising Age, Dec. 9, 1996, http://adage.com/article/news/firefly-licenses-targeting-technology/75969/, 1 page.
Smith, Catherine Arnott, "HealthGate: Too good to be true???" Feb. 5, 1996, https://groups.google.com/forum/, 1 page.
Author Unknown, "Sponsorship Opportunities," HealthGate,https://web.archive.org/web/19961105192255/http://www.healthgate.com/HealthGate/product/sponsorships.html, last updated Sep. 24, 1996, 1 page.
Miyamoto et al., "On Fuzzy Information Retrieval," Japanese Journal of Fuzzy Theory and Systems, vol. 3, No. 3, Nov. 1, 1991, pp. 93-105.
Lieberman, Henry, "Letizia: An Agent That Assists Web Browsing," Media Laboratory, Massachusetts Institute of Technology, http://web.media.miteduhlieber/Lieberary/Letizia/Letizia-Aaai/Letizia.html, 1995, 9 pages.
Netgravity, "NetGravity AdServer Help," http://home.netgravity.com—russ/archive/1.0.5/doc/contents.html, 1996, 73 pages.
Author Unknown, "Short History of Early Search Engines," 2011, http://www.thehistoryofseo.com/The-Industry/Short_History_of_Early_Search_Engines.aspx, accessed May 6, 2014, 5 pages.
Author Unknown, "Ultramatch Behavioral Targeting," InfoSeek, http://info.infoseek.com/doc/ultramatch/Applications_of_Behavioral_Targeting_Ad, from 1997, 6 pages.
Sullivan, Danny, "Where Are They Now? Search Engines We've Known & Loved," Search Engine Watch, Mar. 3, 2003, http://searchenginewatch.com/article/2064954NVhere-Are-they-Now-Search-Engines-Weve-Known-And-Loved, 3 pages.
Non-Final Office Action for U.S. Appl. No. 13/845,955, mailed Jul. 28, 2014, 53 pages.
Non-Final Office Action for U.S. Appl. No. 11/767,598, mailed Dec. 29, 2014, 35 pages.
Final Office Action for U.S. Appl. No. 13/031,478, mailed Dec. 5, 2014, 16 pages.
Final Office Action for U.S. Appl. No. 13/723,642, mailed Dec. 22, 2014, 21 pages.

(56) References Cited

OTHER PUBLICATIONS

Final Office Action for U.S. Appl. No. 13/723,670, mailed Dec. 5, 2014, 21 pages.
Final Office Action for U.S. Appl. No. 13/724,495, mailed Dec. 9, 2014, 19 pages.
Notice of Allowance for U.S. Appl. No. 13/724,369, mailed Dec. 9, 2014, 8 pages.
Notice of Allowance for U.S. Appl. No. 13/031,478, mailed May 1, 2015, 12 pages.
Final Office Action for U.S. Appl. No. 13/845,955, mailed Apr. 30, 2015, 55 pages.

* cited by examiner

ASSOCIATIVE SEARCH ENGINE

CROSS REFERENCE TO RELATED PATENTS/PATENT APPLICATIONS

Continuation Priority Claim, 35 U.S.C. §120

The present U.S. Utility Patent Application claims priority pursuant to 35 U.S.C. §120, as a continuation, to U.S. Utility patent application Ser. No. 13/031,478, filed Feb. 21, 2011, which is a continuation of U.S. Utility patent application Ser. No. 11/767,563, filed Jun. 25, 2007, now issued as U.S. Pat. No. 7,895,183, which is a continuation of U.S. Utility patent application Ser. No. 09/351,747, filed Jul. 8, 1999, now issued as U.S. Pat. No. 7,236,969, which is a continuation of U.S. Utility patent application Ser. No. 08/798,747, filed Feb. 13, 1997, now issued as U.S. Pat. No. 6,098,065, the contents of which are hereby incorporated herein by reference in their entirety and made part of the present U.S. Utility Patent Application for all purposes.

BACKGROUND OF THE INVENTION

The invention generally relates to search engines and, in particular, to an associative search methodology, based on a contextual search engine, for retrieving related information.

The Internet provides an excellent vehicle for access to information about goods and services on a global basis. In theory, anyone can access information about any product. In practice, the problem is one of finding the correct information. Many techniques for solving this problem are known, including: indexing systems such as Yahoo, graphical electronic malls, hall of malls, directories, and text search engines, such as OpenText. These techniques and tools for searching and retrieving information, in their present form, can inundate the user with large amounts of unwanted material.

This later problem can be alleviated somewhat by enabling the user to provide search statements as a set of criteria which are combined with logical operators, such as 'AND', 'OR' and 'NOT' operators. However, many problems still exist with this. One of them is that the user is left to his/her own imagination to try to think of all the alternative descriptions (i.e. keywords) of a product or service. As search engines and techniques become ever more powerful in the number and diversity of databases they can access, the amount of information which it is possible to present to a user can quickly become excessively large. The problem or opportunity still remains to quickly find the relevant information for which the user is looking.

SUMMARY OF THE INVENTION

It is an object of the present invention to provide a new and improved associative search methodology for retrieving related information.

The invention, therefore, according to a first broad aspect provides a method of providing advertisements to a user searching for desired information within a data network, comprising the steps of: receiving, from the user, a search request including a search argument corresponding to the desired information; searching, based upon the received search argument, a first database having data network related information to generate search results; correlating the received search argument to a particular advertisement in a second database having advertisement related information, and providing the search results together with the particular advertisement to the user.

According to a second broad aspect, the invention provides a method of searching for desired information within a data network, comprising the steps of: receiving, from a user, a search request including a search argument corresponding to the desired information; searching, based upon the received search argument and user profile data, a database of information to generate a search result; and providing the search results to the user.

According to a third broad aspect, the invention provides a system for providing advertisements to a user searching for desired information within a data network, comprising; means for receiving, from the user, a search request including a search argument corresponding to the desired information; means for searching, based upon the received search argument, a first database having data network related information to generate search results; means for correlating the received search argument to a particular advertisement in a second database having advertisement related information; and means for providing the search results together with the particular advertisement to the user.

According to a fourth broad aspect, the invention provides a system for searching for desired information within a data network, comprising: means for receiving, from a user, a search request including a search argument corresponding to the desired information; means for searching, based upon the received search argument and user profile data, a database of information to generate a search result; and means for providing the search results to the user.

Conventional search engines, for example OpenText, provide a basis on which the methodology according to this invention may be implemented. In a particular embodiment, the invention is manifested by an advertising system including an associative search engine that may be tied into and form an integral part of the conventional search engine. When an end user accesses the conventional search engine, the associative engine of the selling system examines the user's choices and search instructions, that have been input by the user, and formulates the necessary strategy and tactics to offer products that would appeal to the end user based on his/her inputs and choices up until that point in the search. Since the process is dynamic the strategy and tactics can be continually refined and the results presented to the end user in a predictive order and fashion that relates to that end user's past preferences (either for the immediate search underway or including all prior search data stored for that user) and a contextual database. This effectively provides unobtrusive, related and useful data and options to the end user who is searching for information. The processor used for the advertising and selling mechanism can be a part of or interconnected with the search engine.

Some examples will illustrate how this invention can have high value to an end user. An end user's profile data may contain such information as the make, model and year of automobile he/she owns or leases. When tires are needed, the manufacturers recommended tire types and options may be considered as sort criteria provided within a contextual database. Another example relates to when airline reservations are being sought. All of a person's preferences, which today are normally sorted one by one through a travel agent, could be utilized by the advertising and selling mechanism to provide the informed response.

In addition to the search criterion, as users interact with the advertising system, it will continue to compile preference data (e.g. a list of keywords) for each user. All preferences, for example, can be left in a type of default mode or even presented to the user for him/her to edit and re-prioritize in order to look for diversity or alternatives. The system can detect exceptions and contradictions so that the end user can be shown immediately that some of the options would violate natural tendencies.

Some of the search patterns or preferences will be keyed off of natural interests also such as: social, family, political, technological, geographical, environmental, educational and so on. Once these preferences are known, then an advertisement or a proposed customized product brochure can be prepared.

This invention is also enhanced by advances in technology occurring in the emerging ubiquitous data world, such as new software languages. One example is "Java". Java is an environment that can be exported to an end users platform to run an application which may include graphics, moving demonstrations, cartoon like explanations or even video. The Java like environment could be used to customize with more than name, it can be used to customize with detailed examples.

One other opportunity presented to service providers is the potential to create new and better ways to improve the environment presented to end users of various classes by remembering what was effective for a sale to occur. In this way, key elements of a presentation or search that have higher success can be put into a higher priority or category for further use and therefore more rapid development through even more intense feedback due to subsequent use.

While this invention can be integrated with traditional Internet search engines (such as Yahoo or Lycos), full advantage can be obtained by integrating the invention with an Internet Access provider. An Internet Access Provider can maintain a more complete user database. Customers are localized, so individual databases will contain fewer users. This allows more database space to be allocated to each user. In addition, more detailed information can be maintained, such as geographical location, type of home computer system, and any additional information the user may choose to provide to the Internet Access Provider.

It is anticipated that the Java environment will develop so that it too will learn and adapt. As a user continues to stop presentations at certain points, scan, re-scan, look for further input at certain points, abort a negotiation and so on at certain points, then such points or logic routines could be avoided or alternatives considered. The present invention proposes such a dynamic and relational preferences methodology in order to more rapidly and more effectively couple a user's needs with product or service offerings.

It is also recognized that these techniques may be applied to an educational environment where, for example, a student may be able to have an environment that is aurally enhanced, another one that is visually enhanced, another one that is textually enhanced and yet another that is anecdotally as opposed to logically enhanced. There are many other opportunities due to different personal proclivities, strengths, skills or disabilities.

BRIEF DESCRIPTION OF THE DRAWINGS

The invention will be better understood from the following detailed description of an advertising machine together with reference to the accompanying drawings, in which.

DETAILED DESCRIPTION OF THE DRAWINGS

Figure 1:
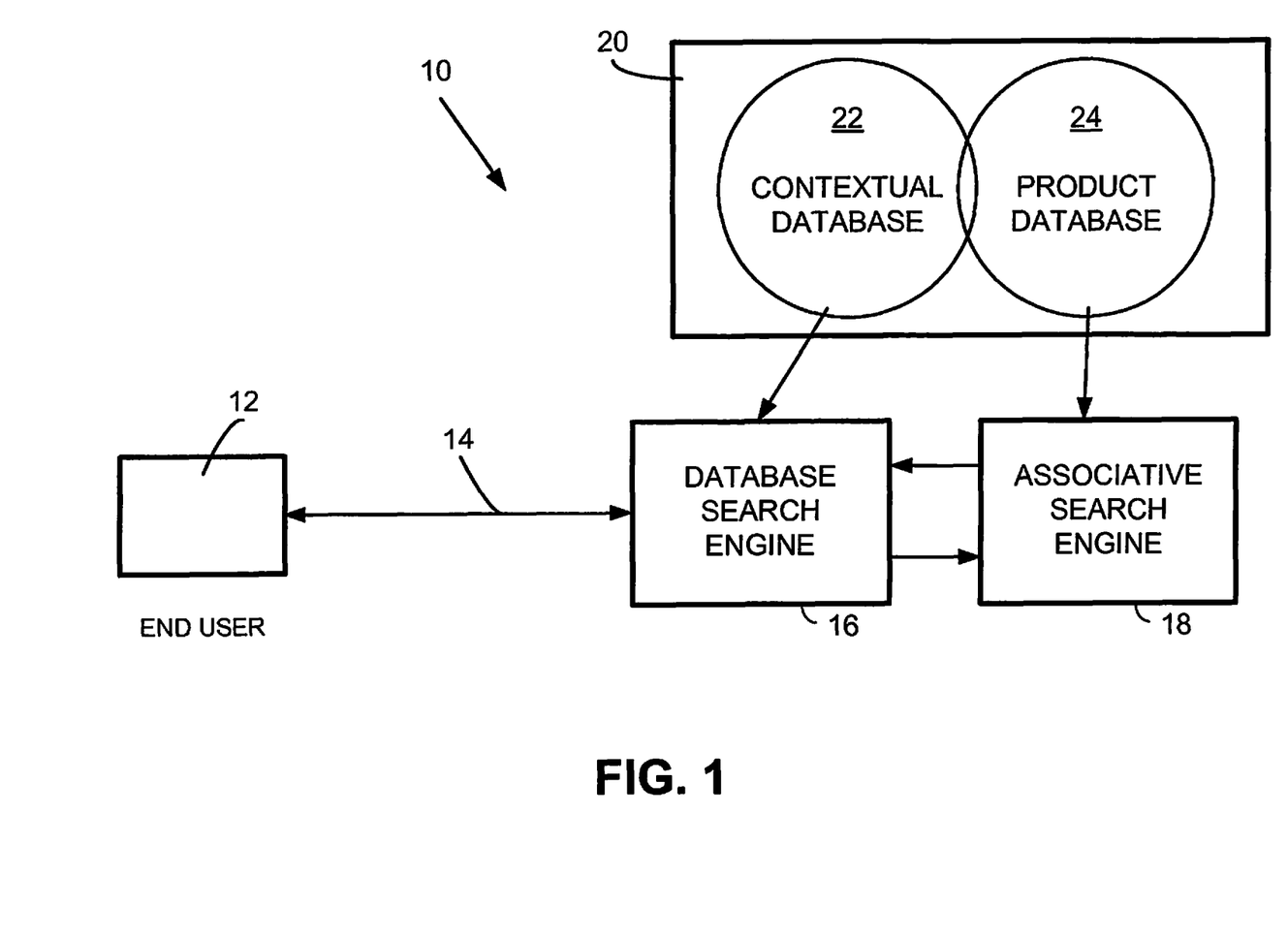
FIG. 1 is a schematic representation of the advertising machine including an associative search engine.

Referring to FIG. 1, shown is an advertising machine, generally referenced by 10, together with a data processing device 12 and a communications link 14 through which the device 12 interacts with the advertising machine 10. The communications link 14 may be provided by a global data network, typically the Internet, and the data processing device 12 may be any conventional hardware/software combination supporting functionality for communications over the Internet. Examples of the data processing device 12 include a personal computer (PC) or Macintosh executing an appropriate browser application, such as, Netscape Navigator which functions as an interface to the World Wide Web (WWW) of the Internet. Functionality provided by the advertising machine 10 may be implemented using an appropriately programmed conventional data processing server platform.

The advertising machine 10, in this particular embodiment, comprises a database search engine 16 and an associative search engine 18 which may access a database 20 having contextual data 22 and product data 24. The database search engine 18 is conventional technology, an example of which is the OpenText engine that provides searches based on subject, strings, boolean, text, etc. Such input search arguments may be received from an end user via the data processing device 12 and data link 14 and, accordingly, the database search engine 16 effects a search of the contextual data 22 in the database 20 and returns results of the search to the end user, as a page displayed on the device 12. The contextual database typically contains information relating to the Internet, for instance, keywords associated with respective WWW site locations.

The associative search engine 18, in accordance with the present invention, may contain rule based software algorithms or non-precise techniques, such as, fuzzy logic that can correlate a search argument derived from the user and changes in the argument during a single session, to particular product data within the product database 24. The associative search engine 18 selects the most logical product from its available data 24 and then provides an advertisement insert that is added to the end user's search page, in an attempt to present the end user with the product that is closest to the need as determined by the associative search engine 18 of the selling machine 10.

In operation, for example, the process effected when an end user at the device 12 accesses the advertising machine 10 is as follows.

1) The end user device 12 sends a search request outlining the search argument to the database search engine 16.

2) The search engine 16, having carried out a traditional search of Internet related information in the contextual data 22, passes the argument and results of the its search to the associative search engine 18 which then looks for a match in the product data 24 of the database 20. The associative search engine 18 may determine a logical product fit to the initial search argument, or it may create a logical tree analysis of possible product fits and selects a probable best product for an advertisement window to be displayed with the search results.

3) The associative engine 18 passes the data of the selected product to the search engine 16 which in turn provides the results of the search against the given argument together with the initial product advertisement to the device 12 for displaying to the end user.

4) The end user refines his or her search by either clicking on a displayed result or refining their search through additional arguments or search criteria.

5) The associative search engine 18 and the database search engine 16 again work together in providing refined data as in (2) above. In the case of the end user clicking on (i.e., selecting) a specific search result, the associative search engine 18 further refines its logical tree strategy and selects the probable best fit product and generates an advertisement.

6) The end user search results advertisement window is continually updated on each selection or refinement using a technology such as Java providing the end user with a continually updated product advertisement that is considered to be most relevant (best fit) at that point in the search. In addition, failure of the end user to click on the advertisement is used as a criterion in the logical tree in providing the appropriate advertisement.

7) Once the end user clicks on (selects) the advertisement displayed on the device 12, an appropriate message is sent to the advertising machine 10 and, in particular, to the associative search engine 18 which may automatically connect the end user to the seller of the product, for instance, by forwarding the browser of the end user device 12 to the WWW site address of the seller. In the product data 24 for this seller, the associative search engine may record that this transaction occurred, in order that a toll for bringing a buyer and seller together may be extracted.

Moreover, user profile data may be maintained on end user device 12 and accessed by the associative search engine 18. The profile data contains, for example, end user preferences and previous search arguments which may be used to augment the individual search arguments received with the search request to select a best fit product advertisement. The associative search engine 18 retrieves and updates the profile data on the device 12, using appropriate messages exchanged over the communications link 14. For example, the search arguments from the current search session may be added to the user profile data.

Figure 2:
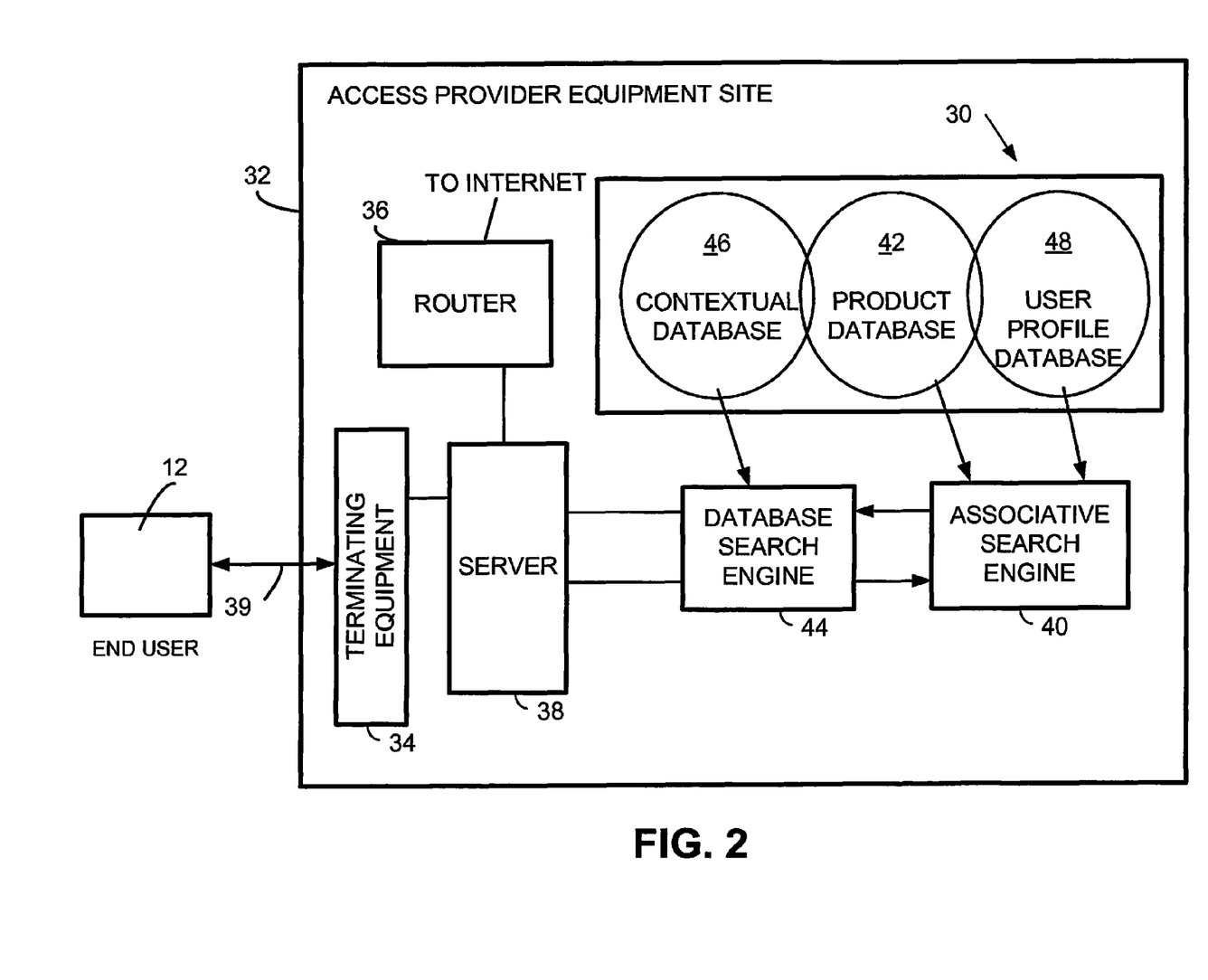
FIG. 2 is a schematic representation of the advertising machine in combination with an Internet Access Service provider.

Turning to the system illustrated in FIG. 2, the advertising machine 30 (similar to the machine 10 in FIG. 1) is integrated as part of the functionality embodied at an Internet access provider equipment site 32 which typically includes a telephone network terminating equipment 34, a router 36 through which TCP/IP packets are transmitted to and received from the Internet, and a server 38 which in general controls operation and couples data calls terminated by equipment 34 to router 36. The link 39 represents a data call established through the telephone network to the access provider site 32.

The associative search engine 40 of machine 30 contains software algorithms or non-precise techniques, such as, fuzzy logic that correlates a search argument derived from the user and changes in the argument during a single session with the product database 42 whereby the most logical product from its available list may be selected. It then provides an advertisement insert that is added to the end user's search page in an attempt to offer the end user with the product that is closest to the need as determined by the associative search engine 40.

The access provider site 32, incorporating the advertising machine 30, is the sole channel available to the end user for accessing the Internet. When an end user carries out a search using the search engine 44 and clicks on (selects) a specific result or chooses an alternate information site address, the information is passed to the associative search engine 40 of that access provider 32. Thus, not only the page with the search results but also the home page of the access provider can be updated with the appropriate advertisement which is selected by the associative search engine 40 from the product database 42. In addition, since the data processing device 12 of the end user is connected through the access provider site 32 for all destinations within the Internet, a comprehensive user profile database 48 may be maintained by the associative search engine 40, about the end users preferences and previous search arguments which may be used to augment the individual search argument received with the search request to select a best fit product advertisement.

In operation, for example, the process effected when an end user at the device 12 accesses the Internet through access provider site 32 is as follows.

1) The end users access the search engine 44, provided as a basic service by the access provider, and requests a search outlining the search argument.

2) The search engine 44 passes the argument and results of its search in database 46 to the associative search engine 40 which looks for a match in the product database 42 determining a logical product fit to the initial search argument. The associative search engine 40 creates a logical tree analysis of possible product fits, and selects or creates a probable best product advertisement for the advertisement window on the search results. In this case, the associative search engine 40 also can utilize the maintained profile on the end user from past search sessions and/or historical data gathered on their buying habits, in the product selection processing. The associative search engine correlates the user's identity to data in the user profile database 48 which it maintains and updates with data (e.g., search argument received with search request) from the current search session.

3) The search engine 44 provides the end user with the results of the search against the given argument including the initial product advertisement from the associative search engine 40. The results and advertisement are displayed by end user device 12.

4) The end user refines his/her search by either clicking on a result, or refining their search through additional arguments or search criteria.

5) The associative search engine 40 and the database search engine 44 again work together in providing refined data as in (2) above. In the case of the end user clicking on (selecting) a specific search result the associative search engine 40 further refines its logical tree strategy and selects the probable best fit product and generates an advertisement.

6) The end user device 12 search results advertisement window is continually updated on each selection or refinement using a technology such as Java, providing the end user with a continually updated product advertisement that is considered to be most relevant (best fit) at that point in the search. In addition, failure of the end user to click on the advertisement is used as a criterion in the logical tree in providing the appropriate advertisement. The access provider's home page sent to the end user can also contain a specialized advertisement constructed from the end user's profile data (e.g., searches and/or buying habits).

7) Once the end user is led to click on the advertisement, the associative search engine 40 of the selling machine 30 takes control and connects the potential buyer to the WWW site of the seller of the product, thereby exacting a toll for the transaction of bringing a buyer and seller together.

Those skilled in the art will recognize that various modifications and changes could be made to the invention without departing from the spirit and scope thereof. It should therefore be understood that the claims are not to be considered as being limited to the precise embodiments of the selling machine set forth above, in the absence of specific limitations directed to each embodiment.

The invention claimed is:

1. A method of providing desired information to a user, comprising:
receiving, from a user having user profile data associated therewith, a search request comprising a search argument indicative of desired information;

providing the search argument and the user profile data to a search engine for searching, based on the search argument and the user profile data, a first database to generate a first search result;

correlating, using at least one non-precise technique, the search argument and the user profile data to particular information in a second database to generate a second search result;

combining the first search result and the second search result; and providing the combined first and second search results to the user.

2. The method of claim 1, wherein the second database is an advertisement database.

3. The method of claim 1, wherein correlating the received search argument and the user profile data with the particular information in the second database comprises using at least one rule-based software algorithm.

4. The method of claim 1, further comprising maintaining a user profile based on past search sessions of the user.

5. The method of claim 1, comprising maintaining a user profile from at least one of past search sessions of the user and historical data gathered on buying habits of the user.

6. The method of claim 1, comprising customizing, based on the user profile data, at least one of the first and second search results for receipt by the user.

7. The method of claim 6, wherein customizing, based on the user profile data, the at least one of the first and second search results comprises at least one of aurally enhancing the search result, visually enhancing the search result, textually enhancing the search result, anecdotally enhancing the search result, and logically enhancing the search result.

8. The method of claim 1, comprising customizing, based on preferences of the user, at least one of the first and second search results for receipt by the user.

9. The method of claim 1, wherein the user profile data comprises geographical data.

10. The method of claim 1, wherein using the at least one non-precise technique comprises using at least one rule based software algorithm.

* * * * *